Figure 1:
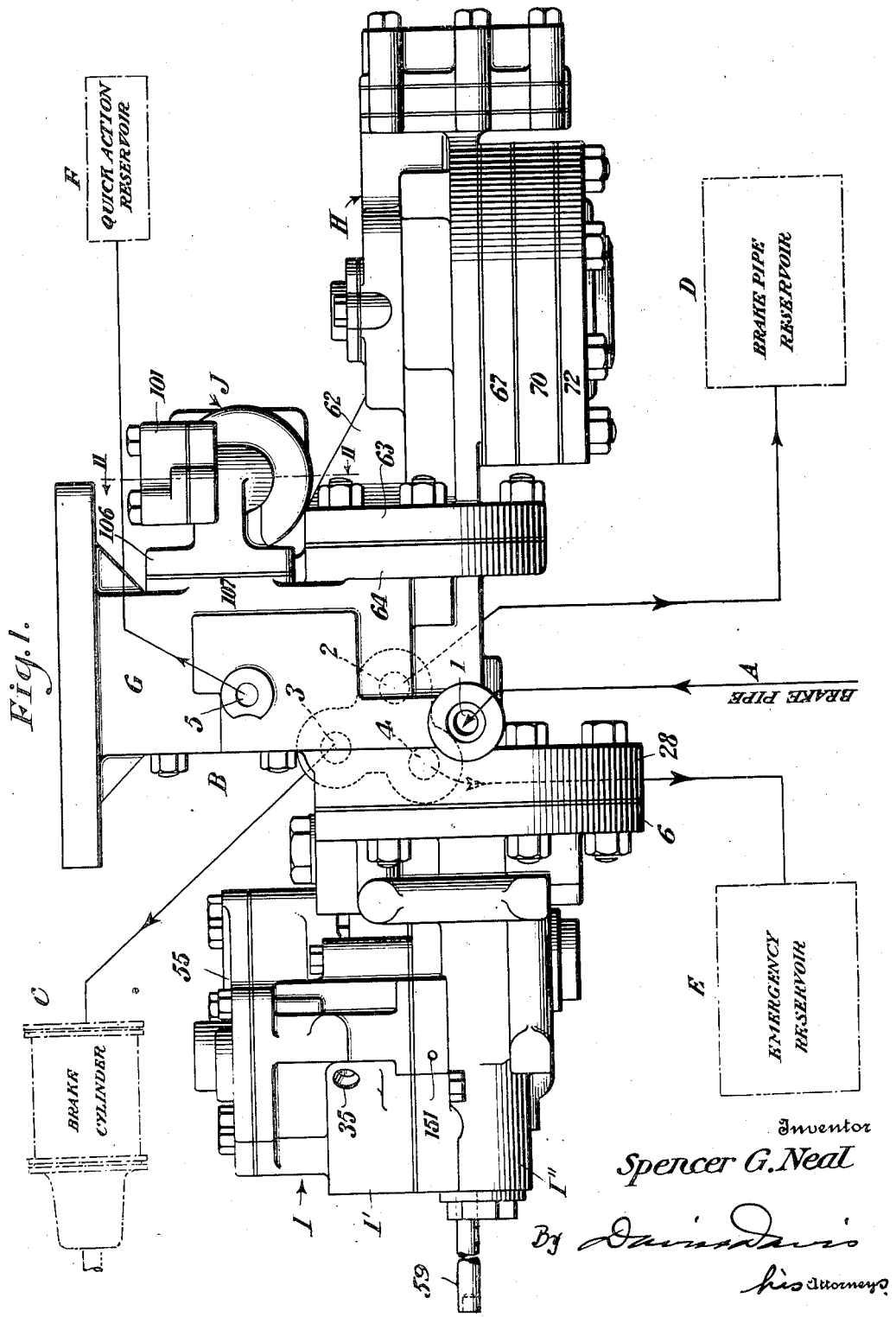

June 26, 1923.

S. G. NEAL 1,459,853

AIR BRAKE APPARATUS

Filed Sept. 24, 1921

13 sheets-sheet 3

Fig. 3.

Inventor
Spencer G. Neal
By
his Attorneys

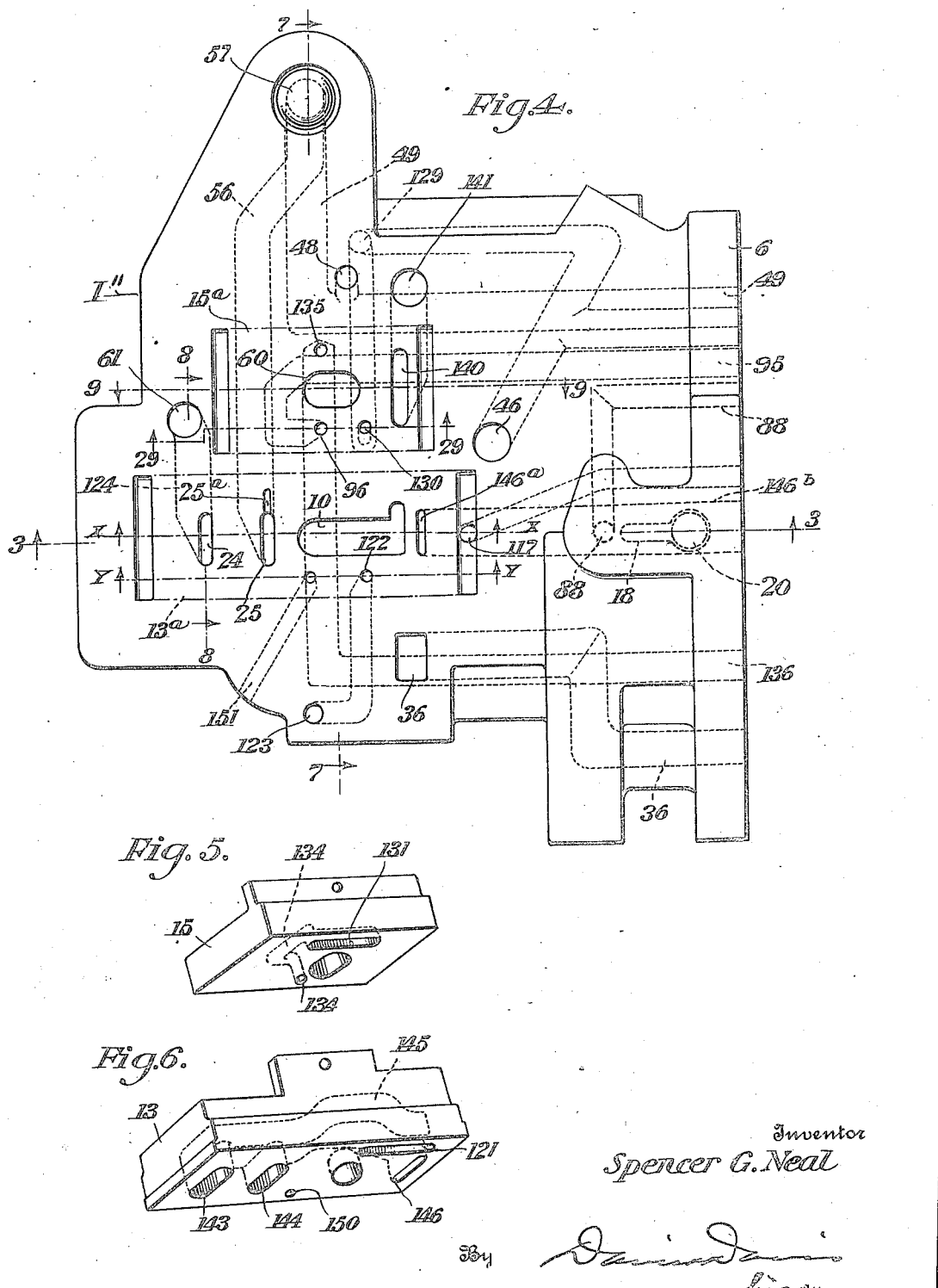

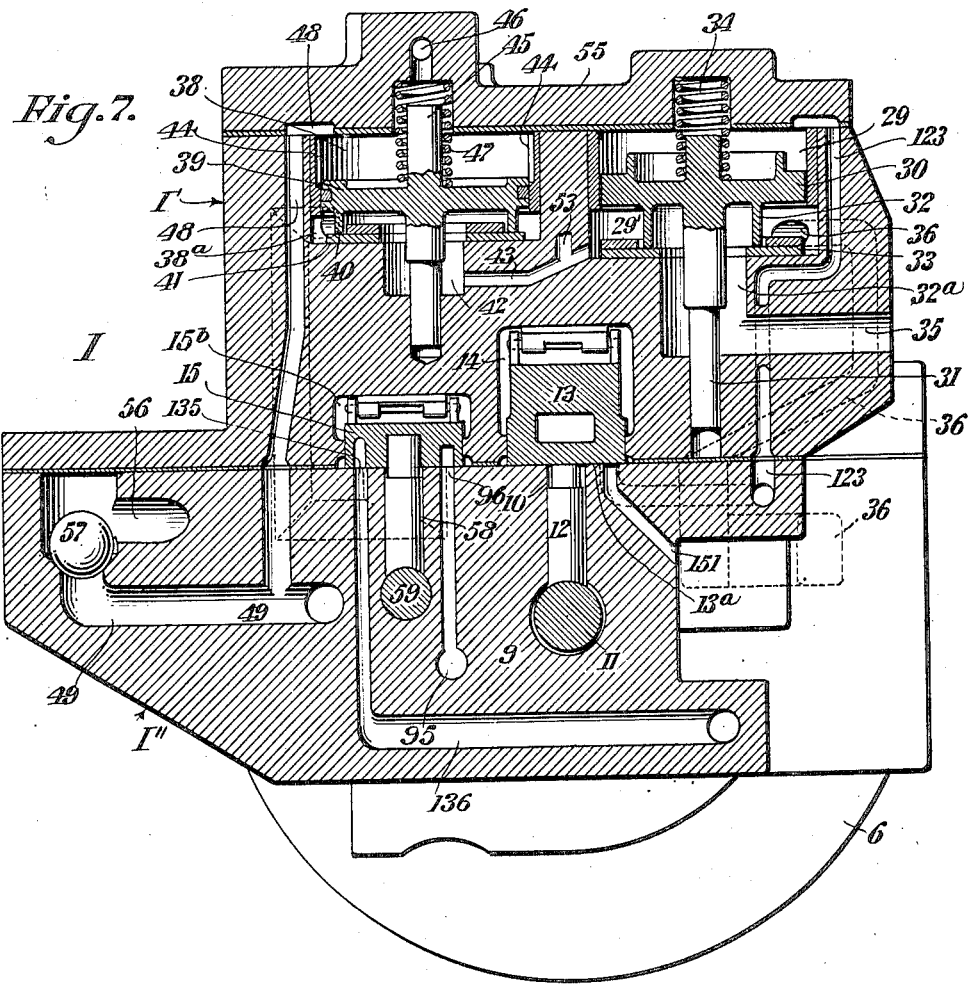
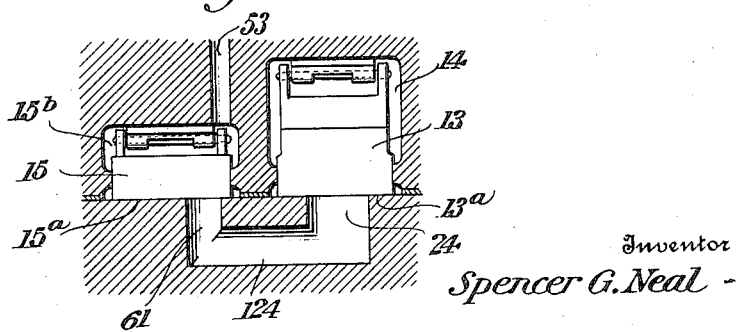

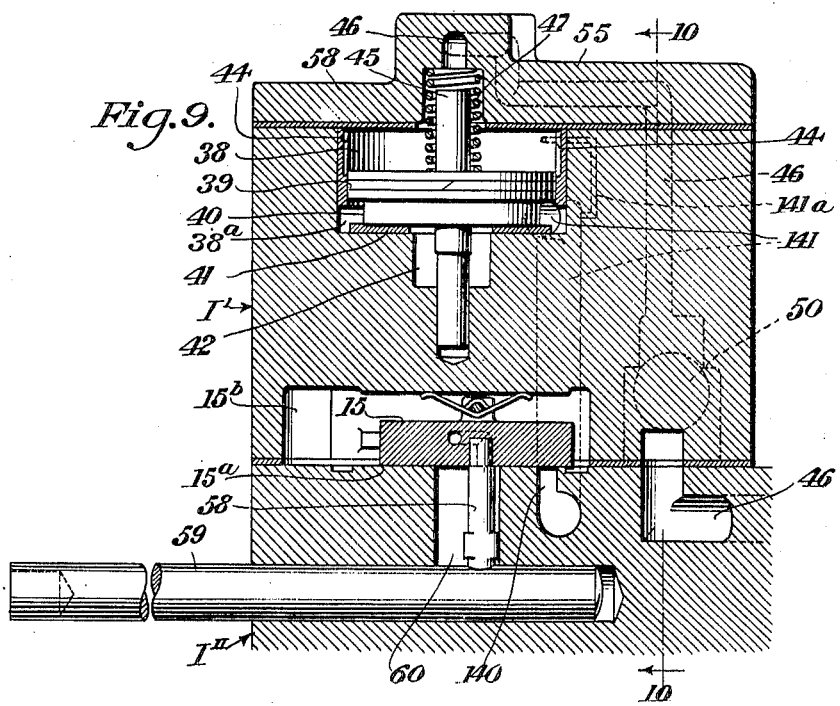
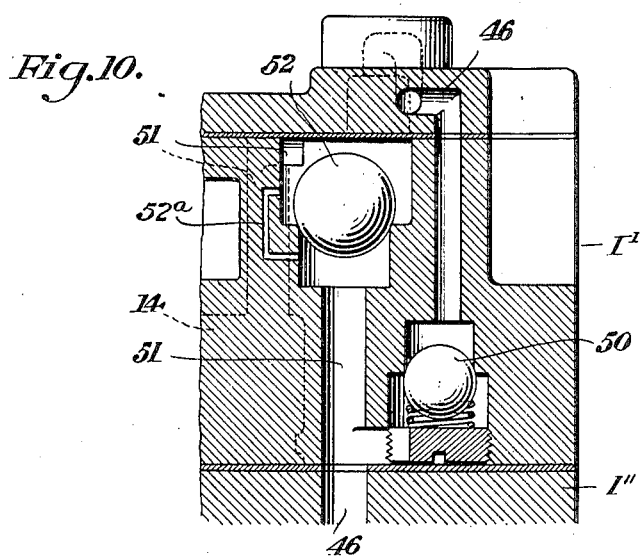

Inventor
Spencer G. Neal

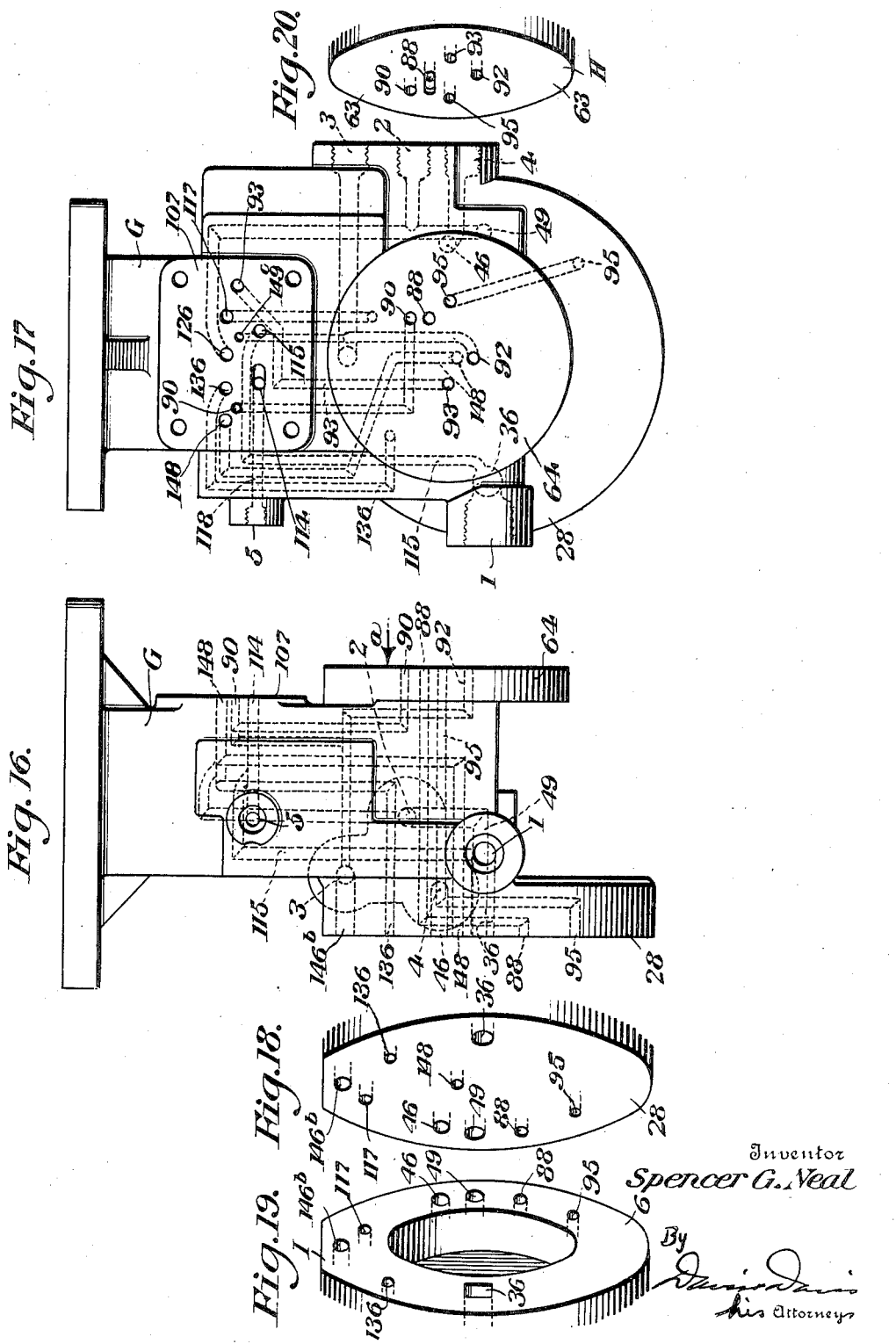

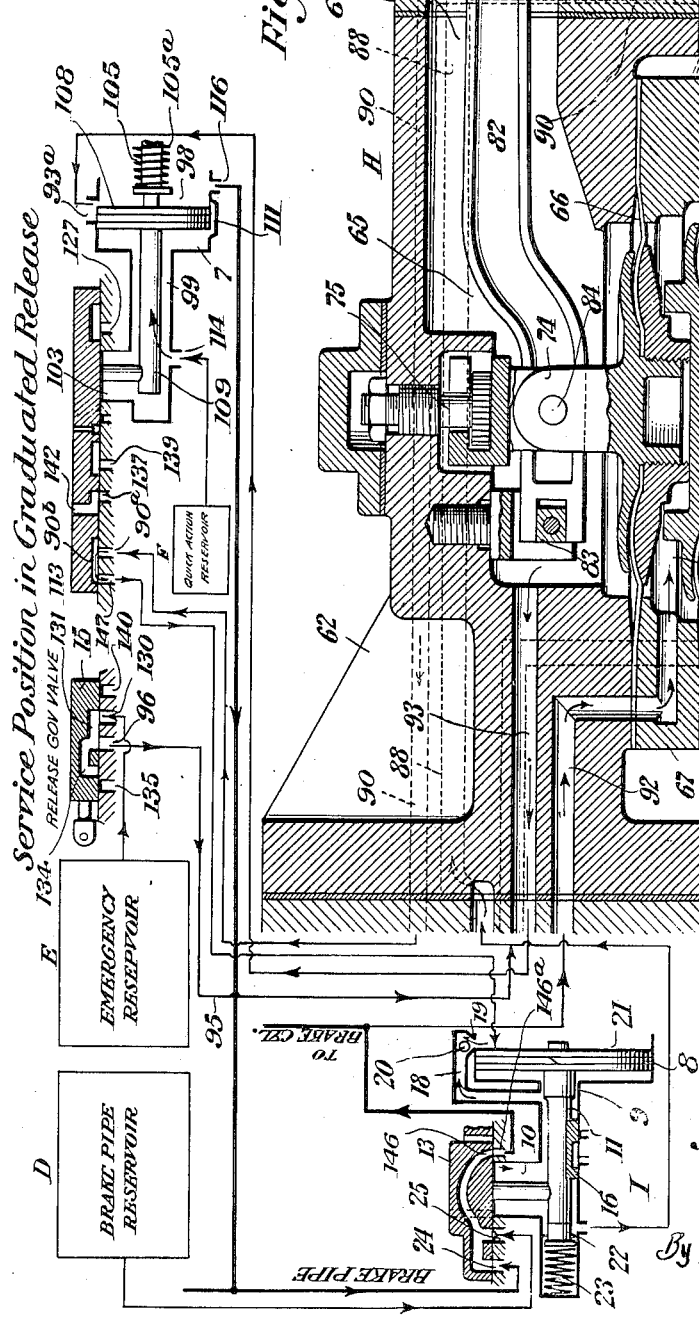

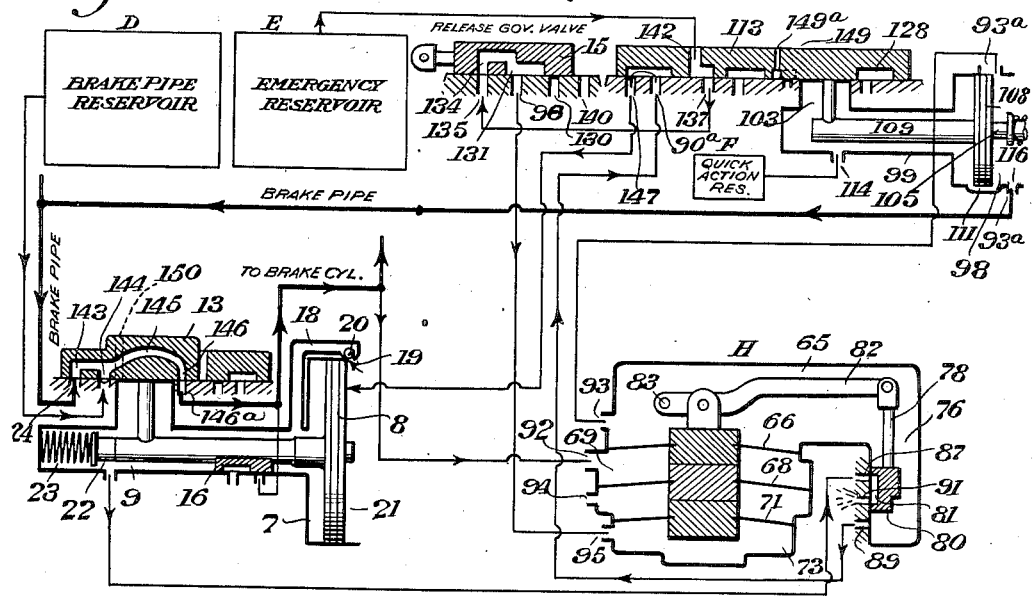

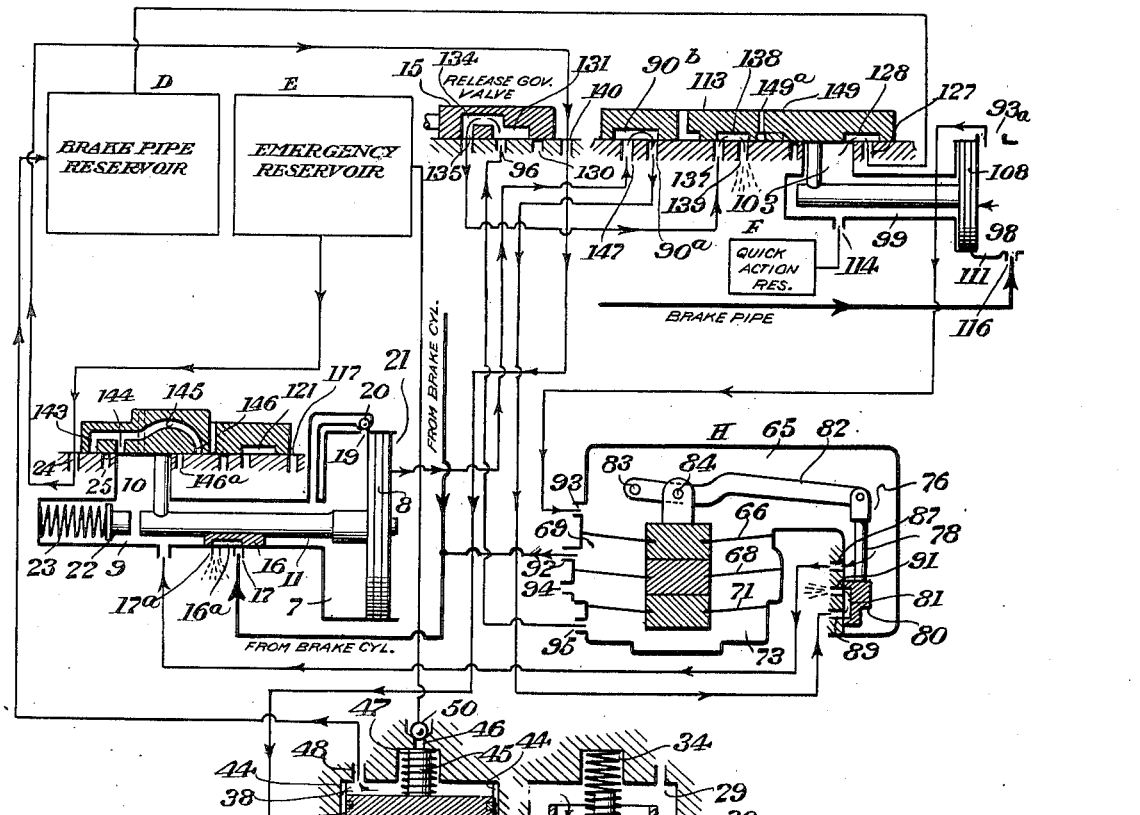
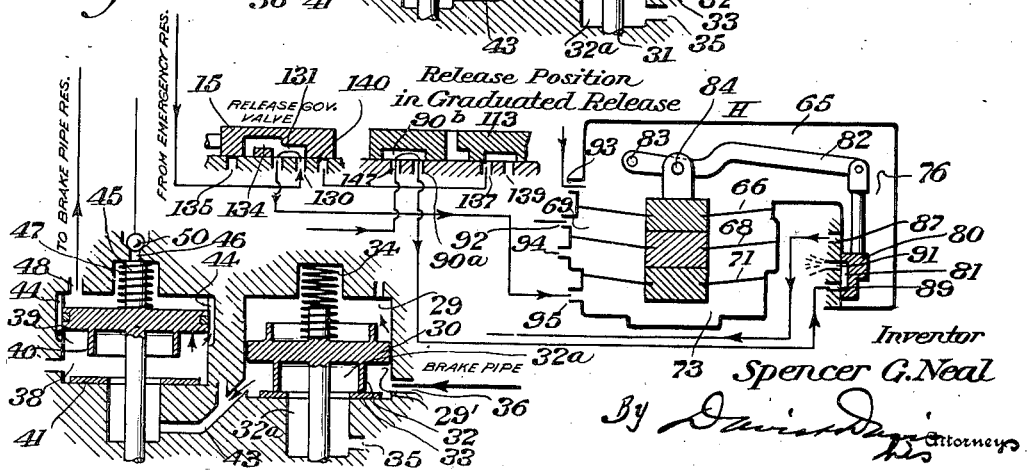

June 26, 1923.
S. G. NEAL
AIR BRAKE APPARATUS
Filed Sept. 24, 1921
1,459,853
13 sheets-sheet 12
Main Slide Valve
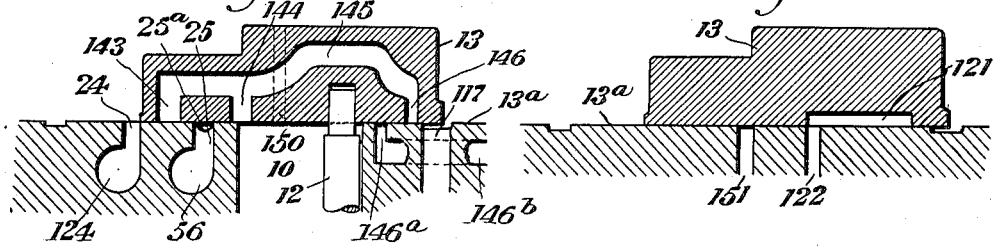
Fig. 25. Release Position
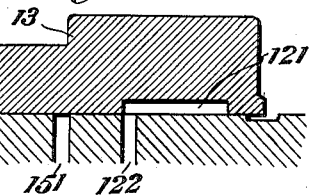
Fig. 25a.
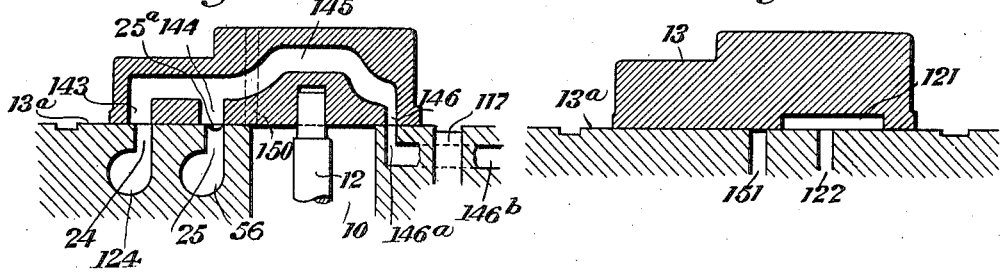
Fig. 26. Service Position  Fig. 26a.
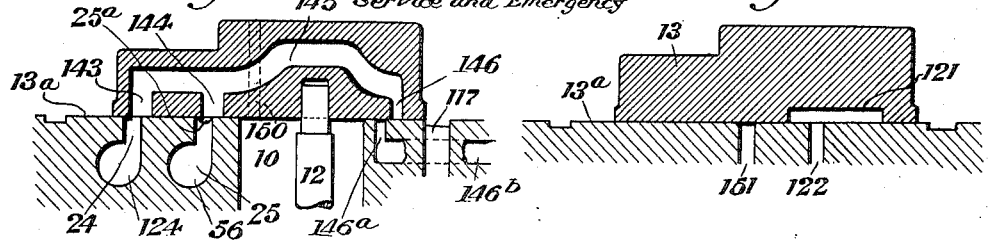
Fig. 27. Lap Position — Service and Emergency  Fig. 27a.
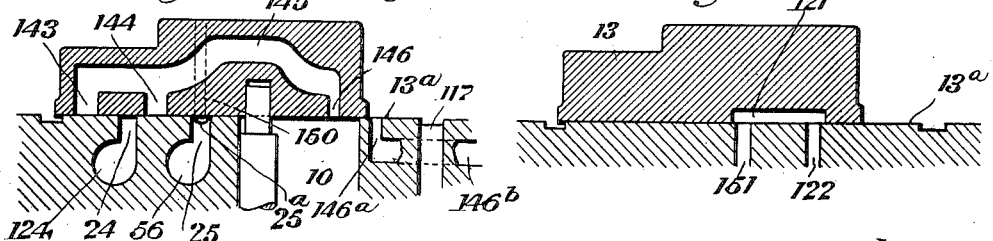
Fig. 28. Emergency Position  Fig. 28a.
Inventor
Spencer G. Neal
By
his Attorneys June 26, 1923.
S. G. NEAL
AIR BRAKE APPARATUS
Filed Sept. 24, 1921  13 sheets-sheet 13
1,459,853
Release Governing Valve
Graduated Release Position
Fig. 29.
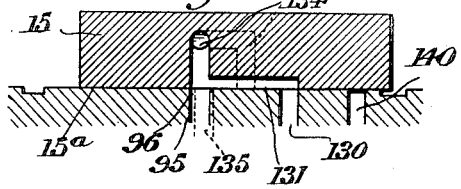
Quick Release Position
Fig. 30.
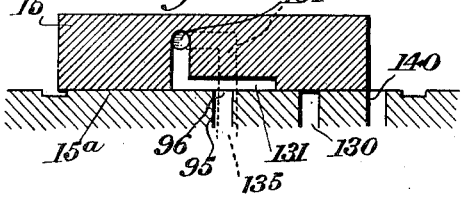
Emergency Slide Valve
Release Position
Fig. 31.
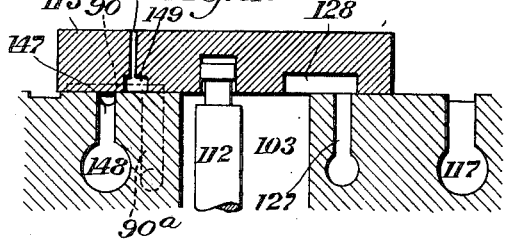
Fig. 31a.
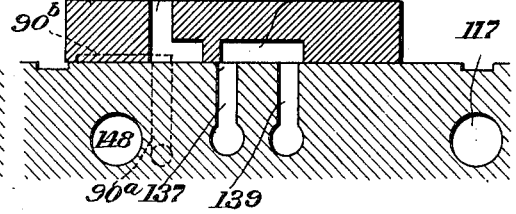
Service Position
Fig. 32.
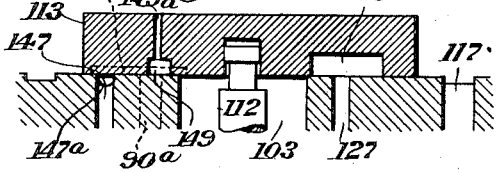
Fig. 32a.
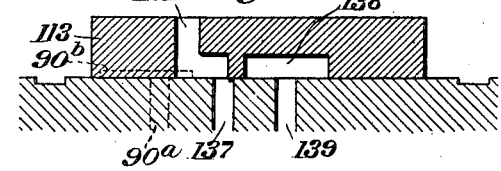
Emergency Position
Fig. 33.
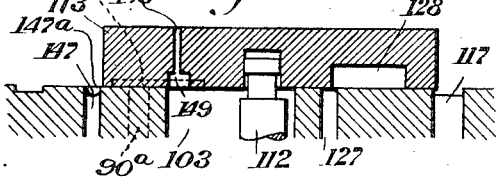
Fig. 33a.
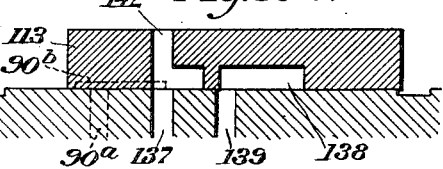
Fig. 33b. Emergency Position
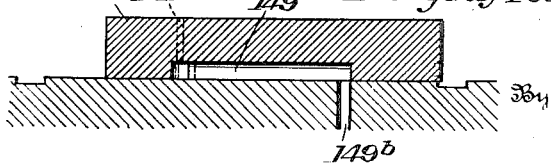
Inventor
Spencer G. Neal
By
his Attorneys Patented June 26, 1923.

1,459,853

UNITED STATES PATENT OFFICE.

SPENCER G. NEAL, OF NEW YORK, N. Y., ASSIGNOR TO AUTOMATIC STRAIGHT AIR BRAKE COMPANY, OF WILMINGTON, DELAWARE, A CORPORATION OF DELAWARE.

AIR-BRAKE APPARATUS.

Application filed September 24, 1921. Serial No. 503,011.

*To all whom it may concern:*

Be it known that I, SPENCER G. NEAL, a citizen of the United States, and residing in the borough of Manhattan, city, county, and State of New York, have invented certain new and useful Improvements in Air-Brake Apparatus (Case 42), of which the following is a specification.

This invention relates to improvements in that type of air brake apparatus wherein brake pipe and brake pipe reservoir air is used for all service applications of the brakes, an emergency reservoir supplying air for emergency applications of the brakes. In such apparatus the brake pipe volume is augmented by the brake pipe reservoir, air from said reservoir passing to the brake cylinder with air from the brake pipe during all service applications of the brakes.

The invention described herein relates more particularly to that type of air brake apparatus disclosed in my Patent 1,411,368, dated April 4, 1922.

One of the important objects of the invention is to provide a main piston to control the movements of the service slide valve, and having main and supplemental brake pipe chambers on opposite sides thereof, and a pilot valve controlling the flow of brake pipe air to and from said chambers to bring about the operation of the main slide valve.

Another object of the invention is to provide a charging valve operating upon an increase of brake pipe pressure to open communication between the brake pipe and brake pipe reservoir and to close communication between the brake pipe reservoir and the emergency reservoir, said valve, upon an equalization of brake pipe and brake pipe reservoir pressures, opening to permit brake pipe reservoir air to flow into the emergency reservoir, whereby the emergency reservoir cannot be fully charged until there is an equalization of pressures in the brake pipe and brake pipe reservoir.

Another object of the invention is to provide a pilot valve to control the pressures in main and supplemental brake pipe chambers on opposite sides of a main service piston, and an emergency valve operating with the pilot valve to govern the operations of the main piston in emergency applications of the brakes, said emergency valve operating upon a sudden reduction of brake pipe pressure to connect the emergency reservoir directly to the main brake pipe chamber to quickly move the main piston to emergency position.

In the drawings, Fig. 1 is a side elevation of the triple valve, the connected brake cylinder and reservoirs being shown diagrammatically.

Figure 2:
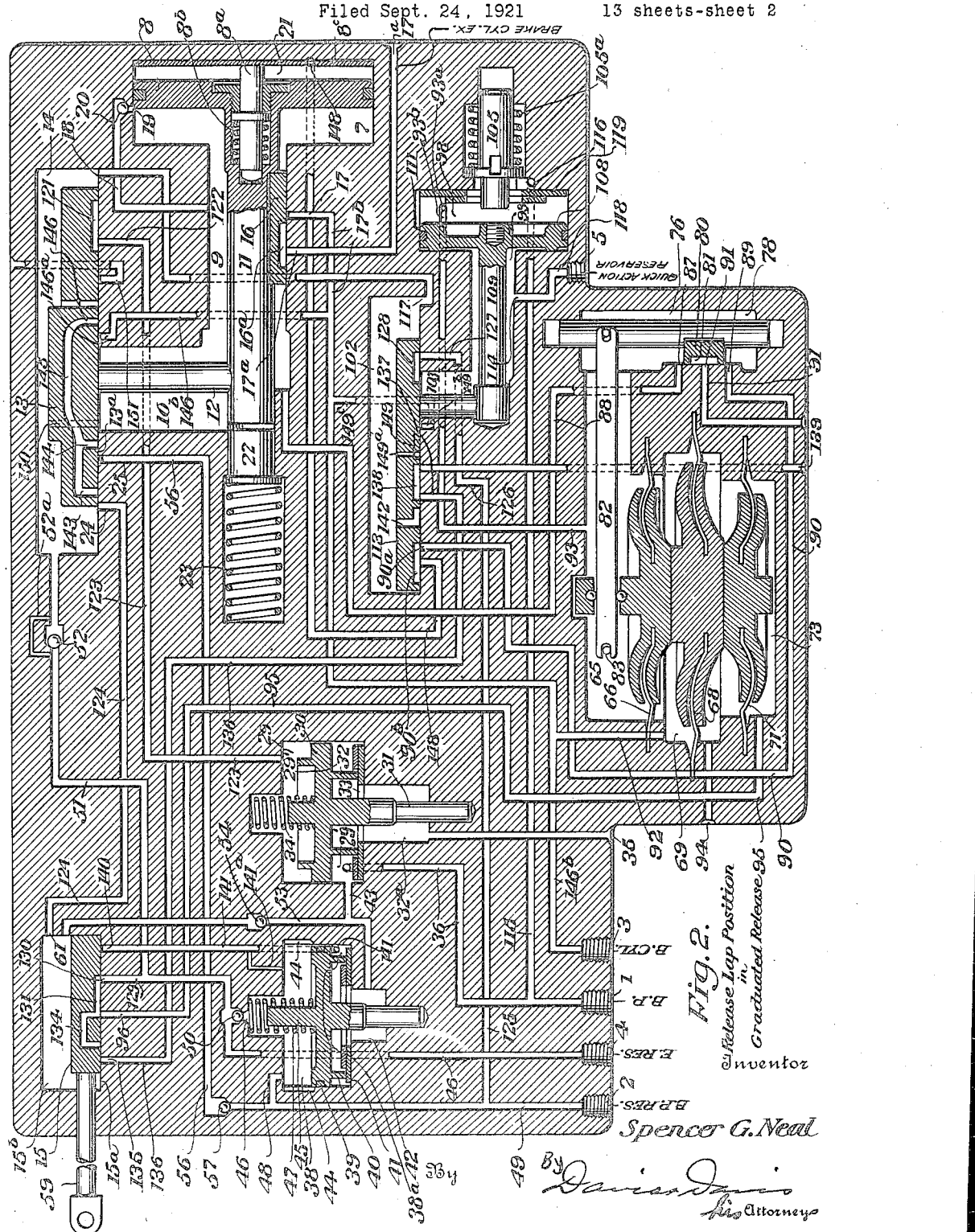

Fig. 2 a diagrammatic sectional view of the triple valve complete with the parts in release lap position and the release-governing valve in graduated-release position.

Figure 11:
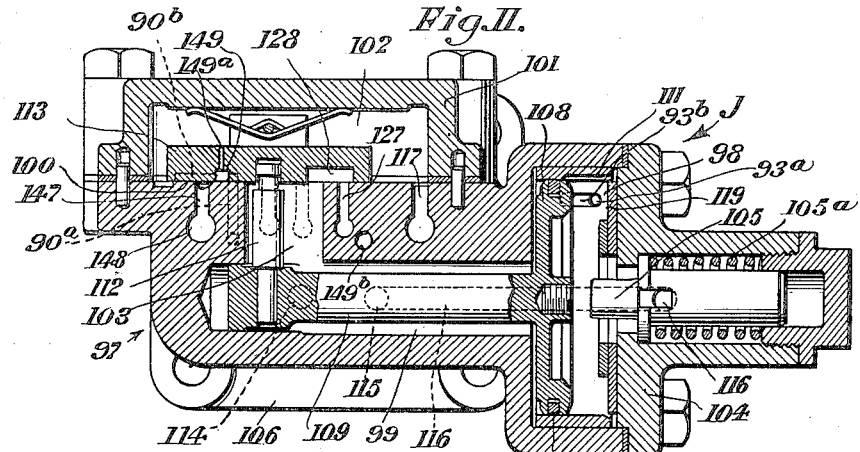
Figure 12:
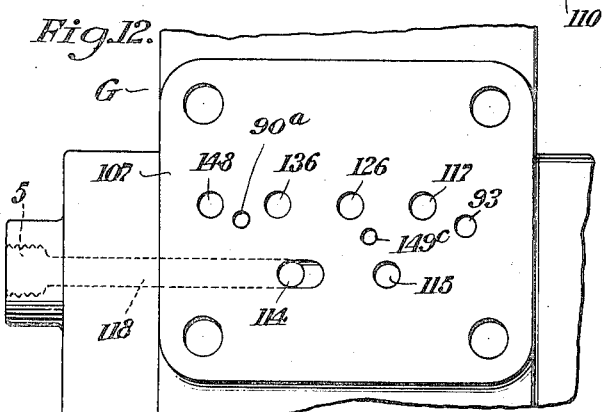
Figure 13:
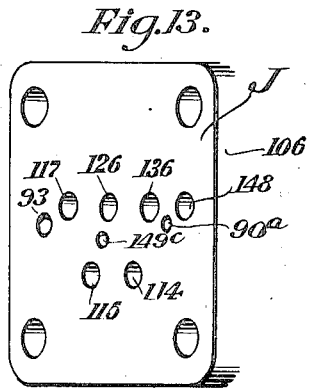
Figure 14:
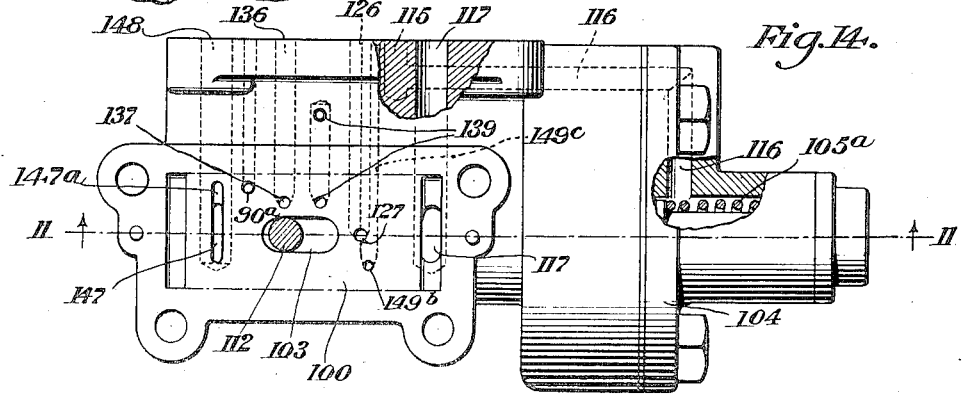
Figure 15:
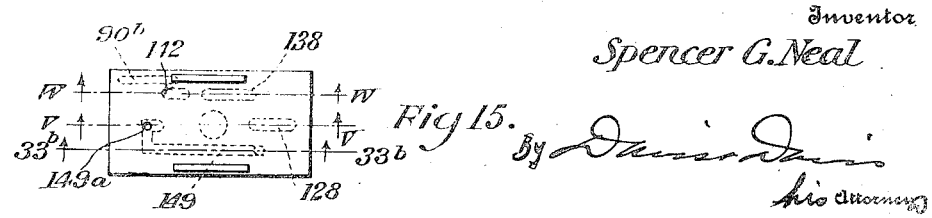

Fig. 3 a vertical sectional view of the main valve section and the connected part of the supporting bracket, the section being approximately on the line 3—3 of Fig. 4;

Fig. 4 a plan view of the lower part of the main valve body section, showing the main slide valve seat and the release-governing valve seat;

Fig. 5 a detail perspective view of the release-governing valve;

Fig. 6 a detail perspective view of the main slide valve;

Fig. 7 a vertical sectional view of the main valve body section taken approximately on the lines 7—7 of Figs. 3 and 4;

Fig. 8 a detail sectional view taken through the main slide valve and release-governing valve chambers, on the line 8—8 of Fig. 4;

Fig. 9 a sectional view through the main valve section taken on the line 9—9 of Fig. 4;

Fig. 10 a sectional view taken approximately on the line 10—10 of Fig. 9;

Fig. 11 a longitudinal vertical sectional view of the emergency valve section taken on the line 11—11 of Figs. 1 and 14;

Fig. 12 a face view of the emergency valve flange of the main bracket;

Fig. 13 a detail perspective view of the flange of the emergency valve section;

Fig. 14 a plan view of the emergency valve section with the emergency valve and valve chamber removed, showing the valve seat, a portion of the valve casing being shown in the sectional view to more clearly illustrate the ports and passages;

Fig. 15 a top plan view of the emergency slide valve;

Fig. 16 a side elevation of the bracket which supports all of the valve sections;

Fig. 17 an end elevation of the bracket shown in Fig. 16, looking in the direction indicated by the arrow *a* in Fig. 16;

Fig. 18 a detail perspective view of the bracket flange to which the main valve section is secured;

Fig. 19 a detail perspective view of the flange of the main valve section which is bolted to the bracket flange shown in Fig. 18;

Fig. 20 a detail perspective view of the flange of the pilot valve section which is bolted to the corresponding flange of the main bracket;

Fig. 21 a vertical central sectional view of the pilot valve section, the other parts of the triple valve being shown diagrammatically and all of the parts being shown in service position with the release-governing valve in graduated-release position;

Fig. 22 a diagrammatic view showing the parts in service position with the release-governing valve in quick-release position;

Fig. 23 a diagrammatic view with the parts in emergency position and the release-governing valve in quick-release position;

Fig. 24 a diagrammatic view with the parts in release position and the release-governing valve in quick-release position;

Fig. 24ª a diagrammatic view with the parts in release position and the release-governing valve in graduated-release position;

Figs. 25 and 25ª to Figs 28 and 28ª, inclusive, sectional views of the main slide valve taken on the lines x—x and y—y, respectively, of Fig. 4, showing the main slide valve in release, service, lap and emergency positions;

Fig. 29 a sectional view of the release-governing valve and its seat, taken on the line 29—29 of Fig. 4, showing the release-governing valve in graduated-release position;

Fig. 30 a view similar to Fig. 29, showing the release-governing valve in quick-release position;

Figs. 31 and 31ª to 33 and 33ª, inclusive, vertical sectional views of the emergency slide valve and its seat, taken on the lines v—v and w—w respectively, of Fig. 15, showing the valve in release, service and emergency positions; and Fig. 33ᵇ a sectional view of the emergency slide valve and its seat taken on the line 33ᵇ—33ᵇ of Fig. 15, with the valve in emergency position.

Referring to the various parts by reference characters, A designates the brake pipe; B the triple valve body; C the brake cylinder; D the brake pipe reservoir; E the emergency reservoir, and F the quick-action reservoir.

In order to simplify the description, the main features of the construction will be first generally described in order to locate them in the structure, and then the various ports, passages and valves will be described in detail in connection with the several valve operations.

The triple valve comprises a bracket G adapted to be secured to the under side of the car body. To this bracket are bolted the pilot valve section H, the main valve casing I, and the emergency valve casing J. All of these sections are provided with suitable flanges which fit corresponding flanges formed on the bracket, the bracket and the various valve sections being provided with suitable cooperating ports and passages. The bracket G is formed with the brake pipe connection 1; the brake pipe reservoir connection 2; the brake cylinder connection 3, and the emergency reservoir connection 4 all of these connections communicating by suitable passages with cooperating ports and passages in the bracket and in the several valve sections. The bracket G is formed also with the quick-action reservoir connection 5, this connection leading through a suitable passage into the emergency valve chamber, as will be fully hereinafter described.

The main valve casing I contains the main service slide valve and its piston; the brake pipe reservoir and the emergency reservoir charging valve; the brake pipe vent valve and the release-governing valve. This casing is formed in two sections,—the upper section I' and the lower section I" (see Fig. 3), the upper section containing the valves hereinbefore mentioned, and the lower section containing the main slide valve actuating piston and the operating rod for the release-governing valve. The lower portion I" of this valve casing is provided with a flange 6 which is bolted directly to a corresponding flange on the bracket G. In this lower section of the valve casing, adjacent the bracket G, is formed a piston chamber 7, the face of the bracket G serving to close said piston chamber when the valve casing is bolted in position; and extending inwardly from said piston chamber is a supplemental brake pipe chamber 9. The upper surface of the section I" of the main valve casing is horizontal, as arranged in the drawings, and on it is formed a seat 13ª for the main slide valve 13 and a seat 15ª for the release-governing valve 15, shown clearly in Fig. 4. A slot 10 is formed in the main slide valve seat and communicates at its lower end with the supplemental brake pipe chamber 9. Arranged in the chamber 7 is the main piston 8 having a piston rod 11 which extends into the supplemental brake pipe chamber and carries at its inner end an upright post 12. This post extends through the operating slot 10 and is connected at its upper end to the main slide valve 13. The upper section I' of the main valve casing is formed with the main slide valve chamber 14 in which the main slide valve operates, and also with the release-governing valve chamber 15ᵇ in which the release-governing valve is arranged. Connected to the piston rod 11 is a release valve 16 which controls a brake cylinder release port 17 formed in the bottom of the supplemental brake pipe chamber 9. The port 17 is connected by passage 17ᵇ to the brake cylinder passage 146ᵇ which leads to the brake cylinder connection 3.

The piston 8 and its stem 11 are centrally bored to receive a release lap plunger 8ᵃ and a release lap spring 8ᵇ. The outer end of the plunger projects beyond the outer face of the piston and is adapted to engage the outer wall of the main brake pipe chamber 21 when the piston 8 is in full release or graduated release lap positions. When the piston 8 goes to full release position the plunger engages the outer wall of chamber 21 and the spring 8ᵇ is compressed until the piston 8 engages a packing gasket 8ᶜ secured to said wall. When operating in graduated release, the pressures on opposite side of piston 8 are equalized or substantially so, through the pilot valve, and the spring 8ᵇ will move the piston and the main slide valve back to graduated release lap position, as shown in Fig. 2. These operations of the main slide valve piston 8 and the pilot valve are hereinafter fully described.

The piston chamber 7 is in communication with the supplemental brake pipe chamber 9 by a passage 18 through a port 19 which is controlled by a check valve 20, said valve opening toward the passage 18. The port 19 is so located that when the piston 8 is moved inwardly to service position, that is, toward the left hand, as viewed in Fig. 3, the port 19 will be cut off from communication with the chamber 7 and placed in communication with a main brake pipe chamber 21 formed between the piston 8 and the face of the bracket G. The piston rod 11 is adapted to engage the plunger 22 which is pressed inwardly by a lap spring 23.

In the main slide valve seat is formed a main brake pipe port 24 and a brake pipe reservovir port 25, which are controlled by the main slide valve, and which are connected to the brake pipe and brake pipe reservoir, respectively, as will be more fully hereinafter described. The main slide valve is formed with suitable ports and passages which cooperate with ports in the slide valve seat, as will be fully hereinafter pointed out in connection with the description of the several operations of the main slide valve.

In the upper section I' (Fig. 7) of the main valve casing is formed a brake pipe vent valve chamber in which is arranged a brake pipe vent valve 30. This valve is in the form of a piston adapted to move vertically in its chamber, being guided by a depending central stem 31' which reciprocates in a suitable guide-opening formed in the casing. The piston 30 divides the brake pipe vent valve chamber into an upper part 29 and a lower part 29'. The piston valve 30 is formed with a depending annular sealing flange 32 which is adapted to engage a gasket 33 on the bottom of the valve chamber for the purpose of closing the brake pipe vent. The sealing flange 32 forms an interior chamber 32ᵃ, which is vented directly to atmosphere by an exhaust port 35. The brake pipe is directly connected to the chamber 29' below the piston 30, by a passage 36; and the pressure is equalized above and below the piston 30 by leakage around the piston. This prevents movement of the piston except in emergency applications of the brakes. The sealing flange 32 of the valve 30 is held pressed against the gasket 33 by a spring 34 and also by the preponderance of air pressure above the valve due to the fact that the area of the under side of the valve within the sealing flange 32 is subject only to atmospheric pressure. Upon a sudden reduction in brake pipe pressure for the purpose of obtaining an emergency application of the brakes, the chamber 29 above the piston 30 will be vented to atmosphere through the main slide valve, to permit the brake pipe pressure in the chamber 29' below the piston to move it upwardly against the tension of the spring 34 and thereby vent the brake pipe through the port 35. This operation and the various ports and passages involved will be more fully hereinafter described.

In the upper section I' of the main valve casing is formed a reservoir charging valve chamber 38. In this chamber is arranged a charging valve 39. This valve is in the form of a piston which fits closely within the valve chamber 38 and is provided with a packing ring to prevent leakage around it. The piston valve is formed with a depending annular sealing flange 40 which is adapted to seat on gasket 41 on the bottom of the valve chamber and to form an interior sealed chamber 42 below the piston. This chamber 42 is in direct communication with the chamber 29' below the piston 30 by passage 43, so that brake pipe air flowing in through passage 36 will enter chamber 42 through the passage 43 (see Fig. 7). In the wall of chamber 38 is formed one or more feed grooves 44. Extending upwardly from the piston 39 is a valve 45 in the form of a stem which, when the piston is elevated, will close an emergency reservoir charging passage 46. A spring 47 normally holds the piston in its lowermost position with the flange 40 sealed against the gasket 41. Opening into the valve chamber 38 at the top thereof is a brake pipe reservoir charging passage 48, said passage leading into the brake pipe reservoir passage 49 formed in the lower section of the main valve casing. A check valve 50 is arranged in the emergency reservoir charging passage 46 to prevent back-flow of air through said passage to the chamber 38.

Brake pipe air, in the charging operation, as will be more fully hereinafter described, flowing into the chamber 42 will raise the piston 39 and uncover the feed grooves 44. Air will then pass around the piston through said feed grooves and into the brake pipe reservoir charging passage 48. When the piston 39 is raised the valve 45 will seat and close the emergency reservoir charging port 46. When the pressures in the brake pipe and the brake pipe reservoir have substantially equalized, the spring 47 will force the piston 39 downwardly and thereby open the emergency reservoir charging port without closing the feed grooves. The emergency reservoir is connected to the main slide valve chamber 14 by passage 51 in which is arranged a check valve 52 which permits air to flow into said chamber 14, but prevents it flowing from said chamber to the emergency reservoir (see Figs. 2, 3, and 10). A small by-pass passage 52$^a$ is formed around check valve 52 to permit air to pass from chamber 14 to the emergency reservoir in the charging operation. The release-governing valve chamber 15$^b$ is connected by passage 53 to the chamber 29' below the piston 30 by means of passage 43. In this passage 53 is arranged a check valve 54 which permits brake pipe air to pass through passage 53 to the chamber 15$^b$, but prevents it passing back to the chamber 29' (see Figs. 2 and 3).

The upper part of the main valve section is provided with a cap plate 55 which serves as a closure for the valve chambers 29 and 38, and in which the necessary registering ports and passages are formed.

Brake pipe reservoir port 25 of the main slide valve seat is connected to the brake pipe reservoir passage 49 by the passage 56, in which passage is a check valve 57 arranged to permit air to flow from the brake pipe reservoir to the port 25 but prevents air flowing from said port back to the brake pipe reservoir. The purpose of this check valve 57 is to permit brake pipe reservoir air to pass into the brake cylinder in service and emergency applications of the brakes, if the brake cylinder pressure is not in excess of the pressure in brake pipe reservoir, and to prevent the equalized emergency reservoir and brake cylinder pressure passing to the brake pipe reservoir if it is the greater pressure in emergency applications.

The release-governing valve 15 is connected by a stem 58 to an operating rod 59 which is suitably mounted in the valve casing. The stem 58 extends upwardly through an operating slot 60. The operating rod 59 projects beyond the valve casing and may be connected to any suitable form of operating device. The valve chamber 15$^b$ is considerably larger than the valve 15, and the interior of said chamber is connected directly to the brake pipe port 24 of the main slide valve seat by means of a port 61 and the connected passage 124. The release-governing valve may be manually adjusted to its quick-release position or to its graduated-release position by operating the rod 59, all of which will be fully hereinafter described.

The pilot valve section H consists of a main top casting 62 which is provided with a flange 63 adapted to cooperate with a corresponding flange 64 formed on the bracket G on the opposite side thereof from the flange 28. In the main top casting 62 is formed an actuating chamber 65, the lower wall of which is formed by an actuating diaphragm 66. The diaphragm 66 is secured in place by means of a ring 67, said ring also serving as the means for spacing the equalizing diaphragm 68 a suitable distance from the actuating diaphragm in order to form the equalizing chamber 69. The equalizing diaphragm is secured in position by means of a spacing ring 70, which ring also serves as a support for the emergency reservoir diaphragm 71, this latter diaphragm being secured in place by a cap plate 72 which forms an emergency reservoir chamber 73 below the diaphragm 71. These diaphragms are all arranged in axial alignment with central supporting heads which abut together in such manner that all of the diaphragms move together except in emergency operations. The actuating diaphragm is provided with an upwardly extending central post 74 which is formed into a yoke at its upper end to engage over the head of bolt 75. The yoke and the bolt head serve as a means to maintain the series of diaphragms in proper relative positions, and as a means for limiting the vertical reciprocating movement of the actuating diaphragm 66. The emergency diaphragm is limited in its downward movement by its lower central flange contacting with a flange on the cap plate 72.

The equalizing diaphragm is larger in area than the actuating diaphragm 66, and the diaphragm 66 is very slightly larger in area than the emergency diaphragm 71. The larger equalizing diaphragm governs the degree of brake cylinder pressure obtained from a given brake pipe reduction. The diaphragm 66 is slightly larger than the emergency diaphragm 71 so that when operating in graduated release and the system is fully charged and there are equal air pressures in chambers 65 and 73, the diaphragm structure will be moved downwardly and the pilot valve will be held in release position, all of which will be more fully hereinafter described. Secured to the casting 62 is the pilot valve chamber 76, the interior of said chamber being in open communication with the actuating chamaber 65 through an operating slot 77 in casting 62, and through a valve seat plate 62ª. A valve rod 78 is mounted in the valve chamber 76 and is arranged to reciprocate vertically in rigid lugs 79 on plate 62ª. This valve rod carries a small pilot valve 80 which slides on a valve seat formed on the plate 62ª and is provided with a groove 81 in its face. The upper end of the valve rod is connected to the outer end of a pilot valve lever 82, the inner end of which is pivotally mounted upon a stud 83 in the actuating chamber; and said lever is pivotally connected to the stem 74 of the diaphragm structure by means of a horizontal pivot 84. It is manifest, therefore, that as the diaphragm structure reciprocates the pilot valve will be moved vertically on its seat.

The valve rod 78 of the pilot valve is provided with a headed pin 78ª to which is connected a rod 85. The lower end of this rod 85 is provided with a head and this head is formed with an open slot which is adapted to receive the pin 78ª, the upper end of said rod sliding loosely through the upper bearing 79 of the rod 78. The rod 85 above the said bearing is provided with a stop to limit the downward movement of the rod. Between the head on the lower end of the rod 85 and the upper bearing of the rod 78 is arranged a spring 86. When the pilot valve is moved to application position the spring 86 is compressed against the lug 79 and serves to assist in moving the pilot valve back to lap position when the desired pressure is in the equalizing chamber 69 and the pressures in the pilot valve structure are balanced as herein described. The rod 85 is so arranged and proportioned that the pilot valve may be moved downwardly to release position without interference.

The pilot valve seat is formed with a port 87 which is in communication with a passage 88 leading to the supplemental brake pipe chamber 9. The valve seat is also formed with a port 89 which is in communication with a passage 90 which leads to a port 90ª in the emergency valve. An exhaust port 91 leads from the pilot valve seat directly to atmosphere. The equalizing chamber is directly connected through passage 92 to the brake cylinder.

The actuating chamber 65 is connected by the passage 93 with the brake pipe, through the emergency valve chamber 98, as will be hereinafter described. The chamber between the equalizing diaphragm 68 and the emergency reservoir diaphragm 71 is permanently vented to atmosphere through passage 94. The emergency reservoir chamber 73 is connected by passage 95 to port 96 in the seat of the release-governing valve. Emergency reservoir air will flow to the chamber 73 through the release-governing valve, as will be more fully hereinafter described.

The emergency valve comprises a main valve body 97, in which is formed an emergency piston chamber 98 and a quick-action chamber 99 extending inwardly therefrom. The upper surface of the emergency valve body is formed into an emergency valve seat 100 which is enclosed by a cap 101 which forms the emergency valve chamber 102. The emergency valve chamber is connected to the quick-action chamber by an operating slot 103. The emergency piston chamber 98 is closed by a cap plate 104 in which is mounted a spring-pressed plunger 105 which extends into the chamber 98. The main body of the emergency valve is formed with a flange 106 which is adapted to be bolted to a corresponding flange 107 formed on the bracket G. These two flanges have coincident ports which will be more fully hereinafter described.

In the emergency piston chamber is mounted an emergency piston 108 which carries the inwardly extending stem 109. The piston is provided with a packing ring 110 to prevent leakage of air around it. The wall of the chamber 98 is provided with a leakage groove 111 to permit air passing around the piston during the time a brake pipe reduction is being made to affect a service application of the brakes, and during this time, spring 105ª is held slightly compressed to permit the quick action reservoir pressure in chamber 99 to flow to the brake pipe without operating the emergency valve to emergency position. When the service brake pipe reduction is completed, the spring 105ª slightly moves piston 105 with piston 108 to the left to close the communication between chambers 98 and 99 previously existing through passage 111. Connected to the inner end of the stem 109 is a vertical post 112 which extends upwardly through the operating slot 103 and is connected to an emergency valve 113. The passage 93 from the actuating chamber 65 enters the emergency piston chamber 98 at port 93ª. The port 93ª opens into a groove 93ᵇ formed in the wall of the chamber 98. When the piston 108 is in emergency position the inner end of the groove 93ᵇ is uncovered and connects port 93ª with the quick-action chamber 99 so that when the emergency valve is in emergency position the actuating chamber 65 of the pilot valve structure will be in communication with the quick action chamber to insure sufficient reduction of pressure in the actuating chamber to hold the pilot valve in service position. This will be more fully hereinafter described in connection with the emergency operation. The brake pipe is connected by passage 115 to the emergency piston chamber through port 116, which port opens into the chamber 98 on the outer side of the piston so that the brake pipe air will tend to force the emergency piston inwardly. The emergency valve chamber 102 is in direct and permanently open communication through passage 117 with the main slide valve chamber 14, so that emergency reservoir air in chamber 14 will be registered in the emergency valve chamber 102. The quick-action reservoir F is in direct communication with the quick-action chamber 99 through passage 118 and 114. This passage 118 connects with port 114 and is permanently open so that the quick-action reservoir will be always in communication with the quick-action chamber, its purpose being to augment the volume of the quick-action chamber in order to insure the movement of the piston of the emergency valve to emergency position when emergency brake pipe reduction is made.

The emergency piston 108 is adapted to seats against a sealing gasket 119 when it moves outwardly to emergency position. This is to prevent leakage of air from the chamber 99 around said piston in emergency applications.

It will be understood that the usual variations in brake pipe pressure, to effect the operations of the triple valve, are secured through the manipulation of the engineer's brake valve.

*Charging system—Graduated release.*

(See Figs. 2, 3, 25, 25ª, 29, 31, and 31ª.)

In charging the system brake pipe pressure is raised in the usual manner. Air flows from the brake pipe A, through the brake pipe connection 1 of the bracket G. From this connection the brake pipe air will flow through passage 36 to the chamber 29' below the emergency vent valve 30, thence through passage 43 into chamber 42 below the charging valve 39, and will raise said valve to uncover the lower ends of the charging grooves 44 and to cause the valve 45 to close the emergency reservoir charging port 46. Air will then flow around the valve 39 and into the brake pipe reservoir charging port and passage 48, and thence through passage 49 into the brake pipe reservoir. Air will continue to flow to the brake pipe reservoir until there is a substantial equalization of pressures in said reservoir and the brake pipe, at which time the spring 47 will partly lower the charging valve 39 and open communication between the emergency reservoir port 46 and the chamber 38 and brake pipe reservoir, thus permitting air to flow from the chamber 38 to the emergency reservoir past check valve 50. So long as the pressure in chamber 38 is below brake pipe pressure the charging valve will remain partly raised and air will flow through the feed grooves 44 until there is a substantial equalization of pressures. This charging operation and the feed of air around the charging valve will continue until the emergency reservoir pressure has been built up to a substantial equalization with the brake pipe and the brake pipe reservoir. When this has taken place the spring 47 will force the charging valve downwardly and cause its flange 40 to seat on the gasket 41 and cut off the brake pipe and chamber 42 from the feed grooves 44.

The purpose of this charging valve is to prevent over-charging the emergency reservoir. The emergency reservoir cannot receive air until the brake pipe reservoir has been charged to an equalization with the brake pipe except that which flows through the by-pass port 52ª around check valve 52. This by-pass will permit the emergency reservoir to be charged very slowly during the charging process of the brake pipe reservoir and if it should be desired to entirely prevent the charging of the emergency reservoir until after the brake pipe reservoir has completely charged, the by-pass port 52ª may be omitted. If the by-pass 52ª should be used, the opening of valve 45 would be for the purpose of hastening of the charging of the emergency reservoir after complete charge of the brake pipe reservoir.

The charging valve 39 serves as an automatic compensator to maintain the brake pipe reservoir pressure equalized with brake pipe at all times, should the said reservoir pressure leak down below the brake pipe pressure. It is clear that should the emergency reservoir leak down, check valve 50 will be lifted and air will flow from the brake pipe reservoir to the emergency reservoir to compensate for said leak. This will result in the charging valve lifting to open communication between the brake pipe, the brake pipe reservoir and the emergency reservoir through the charging valve. An excessive leak in a brake pipe reservoir or in an emergency reservoir will result in a reduction of brake pipe pressure which, if continued, will bring about an application of the brakes throughout the train.

Air will leak around piston valve 30 so that there will be an equalization of pressures in chambers 29 and 29' on opposite sides of the vent valve 30.

In the main slide valve seat is a port 122 which is in communication through a passage 123, with the chamber 29' above the valve 30. In the main slide valve is a groove 121 for the purpose of venting chamber 29 to atmosphere through port 122 in emergency applications, as will be hereinafter described.

Brake pipe air will also flow from the brake pipe connection 1 through passage 115 and port 116 into the emergency piston chamber 98 at the outer side of the said piston, and will force said piston inwardly to the limit of its movement, as shown in Figs. 2 and 11. Brake pipe air also flows from passage 43 through passage 53, past check valve 54 into the release-governing valve chamber 15$^b$. From this chamber it flows through the open port 61, through passage 124 to port 24 in the main slide valve seat and thence into the main slide valve chamber 14. From this latter chamber the air will flow through the open passage 117 into the emergency valve chamber 102. This flow of brake pipe air to chambers 14 and 102 will be only during the initial charging of the apparatus, and serves to hold the valves to their seats during the charging operation. When fully charged emergency reservoir air is in these two chambers at all times.

During the charging of the apparatus brake pipe reservoir air will flow through passages 125 and 126 to port 127 in the emergency valve seat. Port 127 is in communication through groove 128 with the operating slot 103 and the quick-action chamber 99, so that brake pipe reservoir air will flow through said ports and passages into the quick-action chamber and thence through port 114 and passage 118 to the pipe connection 5 and thence to the quick-action reservoir F. Air also flows from the emergency piston chamber through port 93$^a$ and connecting passage 93 into the actuating chamber 65 of the pilot valve section, forcing downwardly the diaphragm and moving the pilot valve 80 to release position (Figs. 24 and 24$^a$). When the pilot valve is in release position, the brake pipe pressure will flow from chamber 65 to chamber 9 at the left side of piston 8 through passage 88 and the chamber 21 will be vented to atmosphere through passage 148, groove 90$^b$ of the emergency slide valve 113, port 90$^a$, passage 90, and atmospheric passage 91 by way of the groove 81 of the pilot valve. Thus the spring 8$^b$ will be compressed and the piston 8 and the main slide valve 13 will be moved to the extreme right uncovering the port 24 in the main slide valve seat, so that the brake pipe pressure flowing through passage 124 as previously described will enter chamber 14 without lifting the slide valve 13 from its seat. With the pilot valve on lap the ports 87 and 89 are open to brake pipe through chambers 76 and 65 as shown in Fig. 2. When, therefore, the pilot valve is moved to charging and release position, port 87 remains open to chamber 76 and port 89 is connected by groove 81 to the exhaust port 91. Port 89 is connected by passage 90 to port 90$^a$ in the emergency valve seat 100. The emergency valve is provided with a groove 90$^b$ which is always in register with port 90$^a$.

In the release and charging position of the emergency valve, groove 90$^b$ connects with a port 147 which leads through passage 148 to the main brake pipe chamber 21, and said chamber will be open to atmosphere through the exhaust port 91. Brake pipe air will flow through port 87 to the supplemental brake pipe chamber 9 and force the main piston and main slide valve to release position. Brake pipe reservoir air also flows, in the service and emergency positions of the main slide valve, from the reservoir connection and passage 49 past check valve 57, through passage 56, and brake pipe reservoir port 25 in the main slide valve seat, but in the charging and release position of the main slide valve, as shown in Figs. 2, and 3, this port is closed.

With the release-governing valve in graduated-release position, as shown in the diagrammatic view, Fig. 2, emergency reservoir air will flow from passage 46 through passage 129 to port 130 in the release-governing valve seat. This port is in communication with a groove 131 in the release-governing valve and said groove is in communication with the port 96 of the release-governing valve seat. From port 96, as has been previously described, passage 95 leads to the emergency reservoir chamber 73 below the emergency diaphragm 71 of the pilot valve section. Emergency reservoir air flows from the emergency reservoir connection 4, through passage 46, passage 51, past check valve 52, into the main slide valve chamber 14, so that when the apparatus is fully charged emergency reservoir pressure will be in chamber 14, and, through passage 117, will flow to emergency valve chamber 102. When the main slide valve is in release position, as shown in Figs. 3, 25, 25$^a$, emergency reservoir air will flow through port 24, passage 124 and port 61, to the release-governing valve chamber 15$^b$.

With the release-governing valve in quick-release position, as shown in Figs. 24 and 29, passage 95 and port 96 leading from the emergency reservoir chamber 73 of the pilot valve section will be connected by groove 131 and port 134 in the release-governing valve, to port 135 of the release-governing valve seat, this latter port being connected by passage 136 to port 137 of the emergency valve seat 100. With the emergency valve in charging position (which is also release and running position), as shown in Figs. 2, 11, 31 and 31$^a$), groove 138 is in communication with port 137 and connects said port with exhaust port 139. The result of these connections is that the emergency reservoir chamber 73 will be vented to atmosphere during the charging operation when the release-governing valve is in quick-release position.

When the release-governing valve is placed in quick-release position port 140 of the release-governing valve seat will be uncovered, and said port is connected by passage 141 to chamber 38ª below the charging valve 39 and outside of the sealing flange 40, so that when the charging valve is raised during the charging operation brake pipe air may flow directly from chamber 42, through passage 141, into the release-governing valve chamber 15ᵇ. When the release-governing valve is in graduated-release position port 140 is closed. Passage 141 is connected to chamber 38 above the piston valve 39 by a small by-pass port 141ª. In charging, a quantity of air might flow through said by-pass to chamber 15ᵇ, but it would have no effect as brake pipe air would be flowing, at that time, to chamber 15ᵇ through passage 53. The real purpose of this by-pass is to place the brake pipe reservoir in communication with chamber 14 and the emergency reservoir when the release-governing valve is adjusted for quick release and the main slide valve is in full-release position, as will be fully hereinafter described.

When the system is fully charged with the release-governing valve in graduated-release position and there is an equalization of pressures in chambers 65 and 73 of the pilot valve structure, the pilot valve will be held in release position due to the slightly larger area of the actuating diaphragm 66 over the emergency diaphragm 71, and chamber 21 will be exhausted to atmosphere.

*Service application position.*

(See Figs. 21, 22, 26, 26ª, 32 and 32ª.)

The service application position of the triple valve will be first described with the release-governing valve adjusted for graduated-release operation. To effect a service application of the brakes the brake pipe pressure is reduced the desired amount in the usual way through the engineer's brake valve. This results in a corresponding reduction of pressure in chamber 98 of the emergency valve, said chamber being connected to the brake pipe through port 116 and passage 115. Brake pipe reservoir pressure and quick-action reservoir pressure in quick-action chamber 99 will force the emergency piston 108 outwardly until it engages the spring-pressed plunger 105, slightly compressing the spring. This uncovers the leakage groove 111 and permits quick-action chamber and quick-action reservoir pressures to reduce with the brake pipe. The actuating chamber 65 is connected to the emergency piston chamber by passage 93 and port 93ª, so that the pressure in the actuating chamber will be lowered with the pressure in the brake pipe. With the emergency valve in service-application position, as shown in Figs. 21, 22 and 32, brake pipe reservoir port 127 is cut off from the quick-action chamber, and port 137 is disconnected from port 139 and placed in communication with the emergency valve chamber 102 through the groove and port 142 to permit emergency reservoir pressure to flow from said chamber 102 into said port 137 and the connected passage 136. With the release-governing valve in graduated-release position, as shown in Figs. 21 and 29, passage 136 and its port 135 is closed by the said release-governing valve. With the release-governing valve in quick-release position, as shown in Figs. 22 and 30, emergency reservoir air will flow through port 134 into port 96, passage 95, to emergency reservoir chamber 73, in order to charge said chamber with emergency reservoir air. With the release-governing valve in graduated-release position, as heretofore described, emergency reservoir air is initially charged into chamber 73.

Emergency reservoir air in chamber 73 will force the diaphragms in the pilot valve structure upwardly against the reduced pressure in chamber 65, thereby moving the pilot slide valve from release position to service position, shown in Fig. 21, in which position the pilot valve groove 81 connects supplemental brake pipe chamber 9, through port and passage 87—88, with the exhaust port 91. Brake pipe air will, therefore, flow from chamber 9 to atmosphere. Port 89 will be opened to chamber 76 and brake pipe air from chamber 76 will flow through passage 90 to port 90ª of the emergency valve seat; thence through groove 90ᵇ to port 147. From port 147 air will flow through passage 148 to the main brake pipe chamber 21. As the pressure is reduced in chamber 9 and the flow of brake pipe air into the main brake pipe chamber 21 is maintained, the piston 8 will be forced inwardly, that is to say toward the left hand, as viewed in the drawings, until equalizing port 19 is uncovered. The piston rod 11, during this inward movement of the piston 8, will force the spring-pressed plunger 22 inwardly against the tension of the spring 23. The pressure in chamber 21 will continue to move the piston 8 inwardly against the tension of the spring 23 until port 19 is uncovered and placed in communication with chamber 21. Port 19 is of smaller capacity than the ports of the pilot valve. When said port is uncovered and pressure can flow from chamber 21 through said port and into chambers 9 and 7, the inward movement of the piston will be stopped with the slide valve in service position. This insures the arresting of the main slide valve in service position, it being manifest that if the pressure in chamber 21 were not relieved through the port 19 the piston 8 would continue its inward movement and the main slide valve would be moved to emergency position. The ports in the pilot valve and the port 19 are so proportioned that the piston 8 cannot be forced to emergency position by brake pipe pressure in chamber 21. Brake pipe air only is supplied to chamber 21 through the pilot valve. The brake pipe air accumulating from chamber 21 in chambers 9 and 7, and the pressure of the spring 23, balance the accumulating brake pipe pressure in chamber 21 and hold the main slide valve in service position so long as the pilot valve is in service position. The inward movement of the piston to service position will carry the main slide valve to the position shown in Figs. 26–26ª. In this position the brake pipe port 24 registers with a corresponding port 143 in the main slide valve, and the brake pipe reservoir port 25 registers with a corresponding port 144 in the main slide valve. These two ports open into a passage 145 which communicates through a port 146 with the brake cylinder port 146ª formed in the main slide valve seat. Port 146ª is in direct communication with the brake cylinder through a passage 146ᵇ. In the service position of the main slide valve brake pipe and brake pipe reservoir air will flow together into the brake cylinder. The brake cylinder release valve 16 is formed with a release groove 16ª which is designed to connect the brake cylinder exhaust port 17 with an atmospheric port 17ª, when the piston 8 is in release position. The inward movement of the piston 8 and its stem to service position carries the valve 16 into position to close brake cylinder exhaust port 17.

Brake cylinder air will flow through passage 92 to the equalizing chamber 69 until the pressure in chamber 69 has been built up sufficiently to compensate for the reduction of pressure in chamber 65. When the pressure in the equalizing chamber 69, plus the reduced pressure in the actuating chamber 65, is sufficient to balance against the undisturbed emergency reservoir pressure in chamber 73, the pilot valve 80 will be moved to lap position. This will cut off exhaust port 91 and open port 87 to chamber 76 so that brake pipe air will then flow to both chambers 9 and 21 and balance the pressures on opposite sides of the piston 8, at which time the service lap spring 23 will move the main service slide valve to lap position (Figs. 27–27ª), thereby partly closing the ports 24 and 25 and moving port 146 from the brake cylinder port 146ª. Until the desired brake cylinder pressure is built up in the equalizing chamber 69 the pilot valve will remain in service position and air will continue to exhaust from chamber 9 through the pilot valve exhaust 91.

This will hold the piston 8 in service position with port 19 open to permit air to flow from the main brake pipe chamber 21 to chamber 9. By properly proportioning the equalizing diaphragm 68 to the other diaphragms of the pilot valve mechanism, the desired pressure will be built up in the brake cylinder for any given reduction in brake pipe pressure.

Should there be a reduction of brake cylinder pressure, due to brake cylinder leakage, during the braking period, there will be a corresponding reduction of pressure in the equalizing chamber 69. This will permit the emergency reservoir pressure in chamber 73 to again move the pilot valve to service position and permit brake pipe air to flow to chamber 21 and exhaust it from chamber 9, and the main slide valve will go to service position. When the desired pressure has been again built up in the brake cylinder, the pilot valve and then the main slide valve will again move to lap position.

If it be desired to increase the brake cylinder pressure a further reduction in brake pipe pressure is made. This will result in a further reduction of pressure in chamber 98 and a consequent further reduction in the actuating chamber 65. The pilot valve will again go to service position, resulting in the main service slide valve again going to service position and an increase in the brake cylinder pressure. The pilot valve will be moved to lap position again when the brake cylinder pressure in chamber 69 has been built up to compensate for the further reduction in chamber 65, then the main slide valve will go to lap position when the pressure in chambers 21 and 9 have substantially equalized through ports 87—88 to 91 and 89—90—90ª—90ᵇ, extension groove 147ª, port 147 and passage 148 to 21.

It is manifest that by repeated reductions in brake pipe pressure the brake cylinder pressure may be built up step by step to any desired pressure up to the full equalization of brake pipes, brake pipe reservoir and brake cylinder. It is also manifest that brake cylinder pressure may be maintained by merely maintaining a predetermined brake pipe pressure; and also that brake cylinder pressure will be uniform without regard to the length of the brake cylinder piston travel and without regard to brake cylinder leaks.

As hereinbefore pointed out, the chamber between equalizing diaphragm 68 and emergency diaphragm 71 is always open to atmosphere through opening 94.

During all service applications of the brakes air flows from the brake pipe and the brake pipe reservoir directly to the brake cylinder, the brake pipe reservoir consti-

Graduated release.

(See Figs. 2, 21, 24ª, 29.)

When it is desired to operate the brakes in graduated release the release-governing valve 15 is moved inwardly to the position shown in Fig. 29, thereby placing the emergency reservoir in communication with the emergency chamber 73 of the pilot valve structure, so that when operating in graduated release emergency reservoir pressure is always under the emergency diaphragm 71. With the release-governing valve in graduated-release position, as indicated, and assuming the brakes to be applied and the valves in service lap position, an increase in brake pipe pressure will, of course, result in an increase of pressure in chamber 98 of the emergency valve, thereby forcing inwardly the piston 108 and moving the emergency valve 113 to release position (Figs. 31–31ª). This will permit brake pipe reservoir air to flow through port 127, groove 128, operating slot 103, into the quick-action chamber 99. From chamber 98 air will flow through port 93ª and passage 93 into the actuating chamber 65, thereby depressing the diaphragms and moving the pilot valve downwardly from lap position to release position, in which latter position groove 81 will connect port 89 to exhaust port 91. This will permit air to flow from the main brake pipe chamber 21 to atmosphere. Port 87 will remain open to chamber 76 and brake pipe air will flow to chamber 9. The reduction of pressure in chambers 21 will permit the brake pipe pressure in supplemental brake pipe chamber 9 to move the piston 8 and the main service slide valve and release valve 16 to release position, thereby connecting port 17 through groove 16ª to port 17ª to allow brake cylinder pressure to escape directly to atmosphere. When the piston 8 is moved to release position the release lap plunger 8ª will engage the outer wall of the chamber 21 and the release lap spring 8ᵇ will be compressed. Air will continue to flow from the brake cylinder until the pressure in chamber 69 has been reduced sufficiently to balance the increase of pressure in the actuating chamber 65. When the reduced pressure in the equalizing chamber and the increased pressure in the actuating chamber balance the emergency reservoir pressure in chamber 73, the pilot valve will be moved to lap position. Air will then flow through ports 87 and 89 until there is an equalization of pressures in chambers 21 and 9, when the lap spring 8ᵇ will move the main slide valve to graduated-release lap position; and the valve 16 will be moved inwardly and close the exhaust port 17. During this release of brake cylinder pressure and the movement of the brake cylinder exhaust valve 16 back to graduated-release lap position, there will be no flow of air from the main brake pipe chamber 21 through the equalizing port 19, as that port will not be in communication with the chamber 21. It is only when the piston 8 is moved inwardly to application position that the port 19 is brought into communication with the chamber 21.

The piston stem 11 and the plunger 8ª are so proportioned that when the said parts are in graduated-release lap position there will be a slight space between the inner end of stem 11 and the service lap plunger 22, and communication will not be established between chambers 9 and 21 through port 19. When the parts are in service lap position stem 11 will remain in engagement with plunger 22 and there will be a slight space between plunger 8ª and the outer wall of chamber 21. Thus there may be a slight (about $\frac{1}{16}$ of an inch) free movement of the parts in either direction without compressing springs 23 or 8ᵇ. When the main slide valve is in graduated-release lap position port 24 in the main slide valve seat is very slightly uncovered, as shown in Fig. 2, so that the emergency reservoir pressure in chamber 14 will be admitted to chamber 15ᵇ above the release-governing valve 15 through port 24 and passage 124 to prevent the emergency reservoir pressure beneath the valve 15 from lifting said valve off its seat. When the main slide valve is in service lap position the port 24 is closed, and this is due to the fact that the stem 11 remains in contact with the plunger 22 and the valve is not moved far enough to uncover the port 24. The slight difference in position of the valve in graduated-release lap and in service lap is due to the slight space between the plunger 22 and the piston stem 11.

During all movements of the main slide valve in service applications and release an approximate equalization of pressures is maintained in chambers 29 and 29′ by leakage around the vent valve 30, and said valve will not be unseated. The rising brake pipe pressure will flow into chamber 42 and raise the charging valve to permit the increased brake pipe pressure to flow through feed grooves 44 into the brake pipe reservoir charging passage 48, thereby recharging the brake pipe reservoir.

If it be desired to further reduce brake cylinder pressure the brake pipe pressure is again increased so that the brake cylinder pressure may be reduced step by step until it is wholly released. It is manifest, therefore, that brake cylinder pressure may be gradually increased step by step or gradually reduced step by step.

Quick release.

(See Figs. 22, 23, 24 and 30.)

When operating in quick-release the release-governing valve is moved outwardly to the position shown in Figs. 22, 23, 24 and 30. In this position of the valve the emergency reservoir chamber 73 of the pilot valve structure is connected to passage 95 and port 96 of the release-governing valve, through port and passage 134 to port 135 which leads through passage 136 to port 137 of the emergency valve seat. In release position of the emergency slide valve 113 port 137 is connected by groove 138 to exhaust port 139. The result of this is that in the release position of the emergency valve, chamber 73 will be vented to atmosphere,—that is to say there will be no pressure in chamber 73 during the initial charging of the apparatus or at any time when the emergency valve is in release position. With the release-governing valve thus adjusted for quick-release operations a decrease in brake pipe pressure will result in the emergency valve moving to application position as hereinbefore described, the port 142 of said valve connecting chamber 102 to port 137 as shown in Fig. 32$^a$. As emergency reservoir air is always maintained in chamber 102 through passage 117, emergency air will pass into port and passage 137—136 and through port 135, the release-governing valve port 134 and port and passage 96—95 to the emergency reservoir chamber 73. This will raise the diaphragm structure against the reduced pressure in the actuating chamber 65 and thereby move the pilot valve to application position. Before the emergency reservoir pressure is admitted to chamber 73 the brake pipe pressure in the actuating chamber 65 will hold the diaphragm structure in its lower position and the pilot valve in release position. When the pilot valve has been moved to service position the operation of the parts takes place precisely as described in connection with the release-governing valve in graduated-release position.

When it is desired to release the brakes with the release-governing valve in quick-release position, an increase of brake pipe pressure forces the emergency piston 108 inwardly to release position and groove 138 connects port 137 to exhaust port 139. Chamber 73 is thereby immediately exhausted to atmosphere and the pressure in the actuating chamber 65 forces the diaphragm structure and the pilot valve to release position. This results in a venting to atmosphere of the main brake pipe chamber 21. Chamber 9 remains connected to brake pipe through pilot valve port 87. As the pressure in the chamber 21 is reduced the brake pipe pressure in chamber 9 moves the piston 8 and the brake cylinder exhaust valve 16 to release position, thereby connecting the brake cylinder exhaust port 17 to atmosphere through port 17$^a$. The main slide valve 13 is also moved to release position, thereby uncovering the brake pipe port 24. Emergency reservoir pressure is in chamber 14 above the main slide valve and flows through port 24 to the release-governing valve chamber and from said chamber through port 140, which is open when the release-governing valve is in quick-release position, as shown in Figs. 24 and 30. From port 140 emergency reservoir air flows through passage 141 into the charging valve chamber 38$^a$ below the charging valve and outside of the sealing flange 40, lifting said valve to take the sealing flange 40 away from the gasket 41, thereby permitting the emergency reservoir air to flow directly into chamber 42. From chamber 42 the high-pressure air will flow through passage 43 into chamber 29' below the vent valve 30, and thence directly into the brake pipe to quickly raise the brake pipe pressure. The increased brake pipe pressure will flow around valve 30 into the chamber 29 above the vent valve, and prevent said valve being unseated by the rising brake pipe pressure. The emergency reservoir air will lift the charging valve 39 to uncover the feed grooves 44 and close port 46 so that the high-pressure air below the charging valve will flow around said valve and into the brake pipe reservoir.

The release of brake cylinder pressure takes place wholly through the brake cylinder release port 17 during all release operations of the triple valve, and the movement of the release valve 16 is wholly controlled by varying the air pressures in chambers 9 and 21.

The emergency reservoir air will quickly equalize into the brake pipe, rapidly raising the brake pipe pressure. As each triple valve is moved to release position the wave of increased brake pipe pressure will flow rapidly throughout the length of the train. The pilot valve will remain in release position with the apparatus fully charged. The chamber 21 is open to atmosphere through the pilot valve exhaust port. When the pilot valve goes to service position pressure will build up in chamber 21, but the piston 8 will not move until the increasing pressure in chamber 21 overcomes the decreasing pressure in chamber 9. The piston 8 and main slide valve will remain in full-release position with the spring 8$^b$ compressed, due to the high brake pipe pressure in chamber 9 and no pressure in chamber 21. A leather gasket 8$^c$ is provided as a valve seat and a stop for piston 8 when the piston is at the extreme right or in full-release position, so that air pressure from chambers 7 and 9 cannot leak to atmosphere past the piston 8 and through the pilot valve. This is the running position in quick release. It is desirable to place the brake pipe reservoir in communication with the emergency by the small leak port 141ª, said port connecting the passage 141 with the charging chamber 38 above the charging valve 39. The object of port 141ª is that when operating in quick release with the port 140 in communication with chamber 15ᵇ, both the emergency reservoir and brake pipe reservoir pressures will be registered in chamber 38 above the piston 39. With these two pressures thus admitted to chamber 38, the piston 39 will positively be more firmly seated upon the gasket 41 and prevent the emergency reservoir pressure from 141 being depleted with the brake pipe pressure when a slow decrease of pressure occurs in the brake pipe. By combining these two pressures in chamber 38 the brakes will be applied positively by train line leakage in case an angle cock should be accidentally or maliciously closed in any portion of the train.

*Emergency position.*

(See Figs. 23, 28, 28ª, 33 and 33ª.)

The emergency operation of the triple valve will be first described with the release-governing valve in position for a quick release of the brakes.

An emergency operation of the triple valve is obtained by a sudden and prolonged reduction in brake pipe pressure. This results in a sudden reduction of pressure in chamber 98 of the emergency valve and in the actuating chamber 65. The pressure in the quick-action chamber 99 immediately forces the piston 108 into engagement with the sealing gasket 119, the superior pressure in the quick-action chamber forcing the piston against the gasket 119 and moving the spring-pressed emergency plunger 105. When the emergency piston 108 is in emergency position it passes beyond port 93ª and places said port in communication with chamber 99. This prevents further reduction of pressure in chamber 65. With the valve 113 in emergency position port 147 will be uncovered and port 90ª will be closed, so that in emergency operations the pilot valve cannot deliver brake pipe air to chamber 21. Emergency reservoir air, which is in chamber 102, will flow through said port 147 and through passage 148 which leads into the main brake pipe chamber 21. The emergency position of the emergency valve also permits emergency reservoir air to flow from chamber 102 through port 142 into port 137, and thence through passage 136 to port 135 of the release-governing valve seat, thence through port 134 of said valve, port 96, and thence through passage 95 to the emergency reservoir chamber 73, forcing the diaphragm structure upwardly and placing the pilot valve in service position. This opens chamber 9 to atmosphere through the port 87 and exhaust port 91, and permits emergency reservoir air in chamber 21 to force the main piston 8 and the main slide valve 13 to emergency position.

In the emergency valve 113 is formed a small groove 149 which, in the emergency position of said valve, places quick-action chamber 99, through slot 103, in communication with port 149ᵇ in the valve seat. Port 149ᵇ is connected by passage 149ᶜ to the brake cylinder passage 146ᵇ, so that in emergency applications quick-action chamber and actuating chamber 65 of the pilot valve structure will be connected to the brake cylinder to insure a sufficient drop in pressure in chamber 65 to hold the pilot valve in service position until the emergency application is complete. Chamber 65 is in communication with quick-action chamber through passage 93, port 93ª and groove 93ᵇ when piston 108 is in emergency position.

To insure a final equalization of pressures in chamber 102, quick-action chamber 99, chamber 65 and the brake cylinder, a small leak port 149ª connects groove 149 with chamber 102, but this leak port is of much smaller capacity than groove 149 and port and passage 149ᵇ and 149ᶜ, and the emergency air flowing through it to the quick-action chamber will not retard or prevent full emergency action.

The emergency reservoir air flowing into the chamber 21 as described will force the piston 8 inwardly to the limit of its movement, the stem 11 engaging the plunger 22 and compressing the lap spring 23. Air will flow through the port 19 into the chamber 9, but as chamber 9 is open to atmosphere through the pilot valve exhaust the piston will remain in emergency position. In the emergency position of the main slide valve 13, shown in Figs. 28–29ª, the brake pipe port 24 is closed. Brake pipe reservoir port 25 is in communication through extension groove 25ª in the valve seat 13ª, with an emergency port 150 in the main slide valve, said port 150 placing the brake pipe reservoir port in communication with the main valve chamber 14. The main slide valve uncovers the brake cylinder port 146ª and places said port in direct communication with the main slide valve chamber 14. As hereinbefore pointed out, the emergency reservoir is in direct communication with the chamber 14 through passage 51, so that emergency reservoir air will flow directly into said chamber 14 and thence directly into the brake cylinder through port 146ª. The check valve 57 will prevent emergency reservoir air flowing into the brake pipe reservoir; but if the brake pipe reservoir pressure is superior to the equalized emergency reservoir and brake cylinder pressures, air may flow past the check valve 57 through port 150 to the main slide valve chamber 14, thereby augmenting the brake cylinder pressure. Any increase in pressure in the chamber 14, due to a flow of air from the brake pipe reservoir, will be immediately communicated through the port and passage 117 to the emergency valve chamber 102. From this chamber the increased pressure will be distributed to the quick-action chamber 99 and thence through 93ª to the actuating chamber. This increased pressure will also flow to chamber 73 from the emergency valve chamber 102 through the release-governing valve. It is, therefore, manifest that should the brake cylinder pressure be augmented by the brake pipe reservoir air, said increased pressure will be balanced throughout the triple valve.

With the main slide valve in emergency position the groove 121 in the main slide valve will connect port 122 of the main slide valve seat with an exhaust port 151, and thereby vent directly to atmosphere chamber 29 above the emergency vent valve 30. The result of this will be that brake pipe pressure below said valve will move said valve upwardly and open the brake pipe directly to atmosphere through the large exhaust port 35. Chamber 42 will be exhausted to atmosphere and brake pipe reservoir air above charging valve 39 will hold said valve to its seat, thereby sealing brake pipe reservoir and preventing escape of air from said reservoir to atmosphere. When there has been an equalization of pressures in chambers 65, 69 and 73, the valve 81 will be in lap position, due to the fact that the actuating diaphragm 66 will float because of the equal pressures on its opposite sides. The larger equalizing diaphragm will be depressed but this will not affect the diaphragm 66 as they are not rigidly connected together. With the pilot valve in lap position there will be a substantial equalization of pressures on opposite sides of the piston 8 through port 19 and port 87 of the pilot valve and passage 88 leading to the chamber 9, and the spring 23 will move the piston and main slide valve to lap position.

With the release-governing valve in graduated-release position the emergency operation is precisely the same as that just described, wherein the release-governing valve is described as in quick-release position, except that emergency reservoir air is in chamber 73 whereas with the release-governing valve in quick-release position the flow of emergency reservoir air to and from chamber 73 is dependent upon the movement of the emergency valve.

The release of the brakes after an emergency application takes place precisely as hereinbefore described, due to the increase of brake pipe pressure in chamber 98 over brake cylinder pressure in chamber 99 of the emergency valve, which will force the emergency piston 108 inwardly and place the emergency valve in release position, as hereinbefore described. Brake pipe air will also flow directly into chamber 65 from chamber 98.

*Running position.*

The positions of the parts in full-release and running positions are the same whether the release-governing valve is adjusted for graduated release or for quick release operations.

With the release-governing valve in graduated-release position the full release and running positions of the parts are shown in Fig. 24ª. In this position the pilot valve is in release position, due to the fact that diaphragm 66 is slightly larger than diaphragm 71. With the pilot valve in release, chamber 21 is open to atmosphere. A reduction of brake pipe pressure for a service application results in the pilot valve moving to service position, due to a reduction in chamber 65 and undisturbed emergency pressure in chamber 73. Air from supplemental brake pipe chamber is thereby exhausted through the pilot valve and high brake pipe air flows to chamber 21, and will start the main piston inwardly to service position, as hereinbefore fully described.

With the release-governing valve in quick-release the pilot valve will be in release position when the apparatus is fully charged and in full-release and running position. (See Fig. 24.) This is due to the fact that chamber 73 is exhausted to atmosphere through the emergency valve (ports and passages 95, 96, 134, 135, 136, 137, 138 and 139) when said valve is in release position. With the pilot valve in release position main brake pipe chamber 21 is exhausted to atmosphere while full brake pipe pressure is in supplemental brake pipe chamber 9. This results in the main piston being forced to full-release position, compressing the spring 8ᵇ. A reduction of brake pipe pressure for a service application of the brakes first moves the emergency valve to service position and puts emergency reservoir air in chamber 73 through ports and passages 142, 137, 136, 135, 134, 96 and 95. This high-pressure air immediately lifts the diaphragm structure against the reduced brake pipe pressure in chamber 65 and moves the pilot valve to service position. In the service position of the pilot valve brake pipe air will flow through the pilot valve ports to main brake pipe chamber 21 and will build up pressure therein. At the same time pressure will flow from the supplemental brake pipe chamber 9. When the increasing pressure in chamber 21 overcomes the reducing pressure in chamber 9 the main piston and its slide valve will move inwardly to service position.

What I claim is:

1. An air brake apparatus comprising a triple valve, a brake cylinder, a brake pipe connected to the triple valve, a main slide valve in said triple valve, a main actuating piston connected to said slide valve, and a pilot valve to admit brake pipe pressure on opposite sides of the main actuating piston independently of the main slide valve, said pilot valve operating upon a reduction of brake pipe pressure to exhaust brake pipe air from one side of said actuating piston to permit brake pipe air on the opposite side of said piston to move it and the main slide valve into position to admit air to the brake cylinder.

2. A triple valve for an air brake apparatus comprising a slide valve, an actuating piston connected thereto, and means for admitting air on opposite sides of said actuating piston independently of the main slide valve, said means operating upon a reduction of pressure to exhaust the air from one side of said actuating piston thereby to permit the pressure on the opposite side of said piston to move said piston and the slide valve connected thereto into position to admit air to a brake cylinder.

3. A triple valve for an air brake apparatus comprising a slide valve, an actuating piston connected thereto, means operating independently of the main slide valve for admitting air on opposite sides of said actuating piston, said means operating upon a reduction of brake pipe pressure to exhaust air from one side of said actuating piston to permit air on the opposite side of said piston to move said piston and the slide valve connected thereto into position to admit air to a brake cylinder, and means operating when the actuating piston and the slide valve are in application position to admit air to the exhausted side of the actuating piston to stop said piston and slide valve in application position.

4. A triple valve for an air brake apparatus comprising a slide valve, an actuating piston connected thereto, means independent of the main slide valve for admitting air on opposite sides of said actuating piston, said means operating upon a reduction of brake pipe pressure to exhaust the air from one side of said actuating piston to permit air on the opposite side of said piston to move said piston and the slide valve connected thereto into position to admit air to a brake cylinder, means operating when the actuating piston and slide valve are in application position to admit air to the exhausted side of the actuating piston to stop said piston and slide valve in application position, and means controlled by brake cylinder pressure to cause the slide valve to move to lap position.

5. A triple valve for an air brake apparatus comprising a main slide valve, an actuating piston connected thereto, means independent of the main slide valve for admitting air on opposite sides of said actuating piston, said means operating upon a reduction of brake pipe pressure to exhaust the air from one side of said actuating piston to permit air on the opposite side of said piston to move said piston and the slide valve connected thereto into position to admit air to a brake cylinder, and means controlled by brake cylinder pressure to cause the slide valve to move to lap position.

6. An air brake apparatus comprising a triple valve, a brake cylinder, a brake pipe connected to the triple valve, a main slide valve in said triple valve, a main actuating piston connected to said slide valve, means independent of the main slide valve to admit brake pipe pressure on opposite sides of the main actuating piston, said means operating upon a reduction of brake pipe pressure to exhaust brake pipe air from one side of said actuating piston to permit brake pipe air on the opposite sides of said piston to move it and the main slide valve into position to admit air to the brake cylinder, and means controlled by brake cylinder pressure to cause the slide valve to move to lap position.

7. A triple valve for air brake apparatus comprising a main slide valve, an actuating piston therefor, and means independent of the main slide valve and operating upon a reduction of brake pipe pressure to cause the piston and slide valve to move inwardly to application position, said means operating independently of the main slide valve upon an increase of brake pipe pressure to cause the actuating piston and the slide valve to move outwardly to release position.

8. A triple valve for an air brake apparatus comprising a main slide valve, an actuating piston connected thereto, means independent of the main slide valve for admitting air on opposite sides of said actuating piston, said means operating independently of the main slide valve upon a reduction of brake pipe pressure to exhaust the air from one side of said actuating piston to permit air on the opposite side of said piston to move said piston and the slide valve connected thereto into position to admit air to a brake cylinder, and means independent of the main slide valve and operating to admit air to the exhausted side of the actuating piston to stop said piston and slide valve in application position.

9. A triple valve for an air brake apparatus comprising a main valve to admit air to the brake cylinder, an actuating means therefor, and means independent of the main valve adapted to admit air on opposite sides of said actuating means, said means operating upon a reduction of brake pipe pressure to reduce the air pressure on one side of said actuating means and to admit air to the other side to actuate said means to move the main valve into position to admit air to a brake cylinder.

10. A triple valve for an air brake apparatus comprising a main valve to admit air to the brake cylinder, an actuating means therefor, and means independent of the main valve adapted to admit air on opposite sides of said actuating means, said means operating upon a reduction of brake pipe pressure to exhaust the air from one side of said actuating means to atmosphere and admit air to the opposite side of said means to move the main valve into position to admit air to a brake cylinder.

11. A triple valve for an air brake apparatus comprising a main valve to admit air to the brake cylinder, an actuating means therefor, means independent of the main valve adapted to admit air on opposite sides of said actuating means said means operating upon a reduction of brake pipe pressure to exhaust the air from one side of said actuating means and admit air to the opposite side of said means to move the main valve into position to admit air to a brake cylinder, and means independent of the main valve and operating to admit air to the exhausted side of the actuating means to stop the valve in application position.

12. A triple valve for an air brake apparatus comprising a main valve to admit air to the brake cylinder, an actuating means therefor, means operating independently of the main valve adapted to admit air on opposite sides of said actuating means said means operating independently of the main valve upon a reduction of brake pipe pressure to exhaust the air from one side of said actuating means to atmosphere and admit air on the opposite side of said means to move the valve into position to admit air to a brake cylinder, and means operating independently of the main valve to admit air to the exhausted side of the actuating means to stop the valve in application position.

13. A triple valve for an air brake apparatus comprising a main valve to admit air to the brake cylinder, an actuating means therefor, and means independent of the main valve adapted to admit brake pipe pressure on opposite sides of said actuating means said means operating upon a reduction of brake pipe pressure to exhaust brake pipe air from one side of said actuating means to permit the brake pipe air on the opposite side of said actuating means to move the valve into position to admit air to the brake cylinder.

14. A triple valve for an air brake apparatus comprising a main valve to admit air to a brake cylinder, an actuating means therefor, means independent of the main valve adapted to admit brake pipe pressure on opposite sides of the said actuating means said means operating upon a reduction of brake pipe pressure to exhaust brake pipe air from one side of said actuating means and admit brake pipe air on the opposite side of said actuating means to move the main valve into position to admit air to a brake cylinder, and means independent of the main valve and operating to admit air to the exhausted side of the actuating means to stop the valve in application position.

15. A triple valve for an air brake apparatus comprising a main valve to admit air to a brake cylinder, an actuating means therefor, means independent of the main valve adapted to admit brake pipe pressure on opposite sides of the said actuating means said means operating upon a reduction of brake pipe pressure to exhaust brake pipe air from one side of said actuating means and to admit brake pipe air on the opposite side of said actuating means to move the main valve into position to admit air to a brake cylinder, and means independent of the main valve and operating to admit brake pipe air to the exhausted side of the actuating means to stop the valve in application position.

16. An air brake apparatus comprising a triple valve, a brake cylinder, a brake pipe connected to the triple valve, a main slide valve in said triple valve, a main actuating piston connected to said slide valve, means independent of the main slide valve adapted to admit brake pipe pressure on opposite sides of the main actuating piston said means operating upon a reduction of brake pipe pressure to exhaust brake pipe air from one side of said actuating piston and admit brake pipe air on the opposite side of said piston to move it and the main slide valve into position to admit air to the brake cylinder, and means controlled by the actuating piston and operating to admit air to the exhausted side of the actuating piston to stop said piston and slide valve in application position.

17. An air brake apparatus comprising a triple valve, a brake cylinder, a brake pipe connected to the triple valve, a main slide valve in said triple valve, a main actuating piston connected to said slide valve, means independent of the main slide valve adapted to admit brake pipe pressure on opposite sides of the main actuating piston said means operating upon a reduction of brake pipe pressure to exhaust brake pipe air from one side of said actuating piston and admit brake pipe air on the opposite side of said piston to move it and the main slide valve into position to admit air to the brake cylinder, and means operating independently of the main slide valve and when the slide valve is in application position to admit brake pipe air to the exhausted side of the actuating piston to stop said piston and slide valve in application position.

18. An air brake apparatus comprising a triple valve, a brake cylinder, a brake pipe connected to the triple valve, a main slide valve in said triple valve, a main actuating piston connected to said slide valve, means independent of the main slide valve adapted to admit brake pipe pressure on opposite sides of the main actuating piston said means operating upon a reduction of brake pipe pressure to exhaust brake pipe air from one side of said actuating piston and admit brake pipe air on the opposite side of said piston to move it and the main slide valve into position to admit air to the brake cylinder, said means being also controlled by brake cylinder pressure to cause the slide valve to move to lap position, and means operating when the slide valve is in application position to admit brake pipe air to the exhausted side of the actuating piston to stop said piston and slide valve in application position.

19. A triple valve for an air brake apparatus comprising a main valve to admit brake pipe air to the brake cylinder for a service application of the brakes, an actuating means therefor, and means independent of the main valve adapted to admit brake pipe air on opposite sides of said actuating means said means operating upon a reduction of brake pipe pressure to exhaust the air from one side of said actuating means and admit brake pipe air to the opposite side of said actuating means to move the valve into position to admit brake pipe air to a brake cylinder.

20. A triple valve for air brake apparatus comprising a main slide valve, an actuating piston therefor, and means independent of the main slide valve operating upon a reduction of brake pipe pressure to cause the piston and slide valve to move inwardly to application position, said means being controlled by brake cylinder pressure, brake pipe pressure and the pressure of an emergency reservoir to cause the slide valve to move to lap position when the desired pressure has been built up in the brake cylinder.

21. An air brake apparatus comprising a brake pipe, a brake cylinder, a brake pipe reservoir, a slide valve, an actuating piston therefor, means independent of the main slide valve adapted to admit brake pipe air on opposite sides of said piston said means operating upon a slow reduction of brake pipe pressure to exhaust brake pipe air from one side of the actuating piston to atmosphere and admit brake pipe air on the opposite side of said piston to move the slide valve into position to connect the brake pipe and the brake pipe reservoir to the brake cylinder for a service application of the brakes, said means being actuated by brake cylinder pressure to stop the flow of air from one side of the actuating piston to atmosphere and to admit brake pipe air to both sides of the said piston and thereby permit the slide valve to be moved to lap position, and means to connect the brake pipe to the exhausted side of the actuating piston to stop the valve in application position.

22. An air brake apparatus comprising a brake pipe, a brake cylinder, an emergency reservoir, a brake pipe reservoir, a main slide valve, an actuating piston therefor, means independent of the main slide valve adapted to admit brake pipe air on opposite sides of said piston said means operating upon a slow reduction of brake pipe pressure to exhaust brake pipe air from one side of the actuating piston to atmosphere and admit brake pipe air on the opposite side of said piston to move the piston and slide valve into position to connect the brake pipe and the brake pipe reservoir to the brake cylinder for a service application of the brakes and also to connect the brake pipe to the exhausted side of the actuating piston to stop the valve in application position, said means being also controlled by brake cylinder pressure to stop the flow of air from one side of the actuating piston and to admit brake pipe air to both sides of the actuating piston and thereby cause the slide valve to move to lap position, and means operating upon a sudden reduction of brake pipe pressure to connect the brake pipe to atmosphere and to connect the emergency reservoir and the brake pipe reservoir to the brake cylinder.

23. An air brake apparatus comprising a brake pipe, a brake pipe reservoir, a slide valve, an actuating piston therefor, means independent of the main slide valve adapted to admit brake pipe air on opposite sides of said piston said means operating upon a slow reduction of brake pipe pressure to exhaust brake pipe air from one side of the actuating piston and to admit and maintain brake pipe pressure on the opposite side thereof, whereby the brake pipe pressure will move the slide valve into position to connect the brake pipe and the brake pipe reservoir to the brake cylinder for a service application of the brakes, and means to connect the brake pipe to the exhausted side of the actuating piston to stop the valve in service application position.

24. An air brake apparatus comprising a brake pipe, a brake pipe reservoir, a slide valve, an actuating piston therefor, means independent of the main slide valve adapted to admit air on opposite sides of said piston said means operating upon a slow reduction of brake pipe pressure to exhaust air from one side of the actuating piston and to admit and maintain pressure on the opposite side thereof, whereby the slide valve will be moved into position to connect the brake pipe and the brake pipe reservoir to the brake cylinder for a service application of the brakes, and means to connect the brake pipe to the exhausted side of the actuating piston to stop the valve in service application position.

25. An air brake apparatus comprising a brake pipe, a brake pipe reservoir, a slide valve, an actuating piston therefor, means independent of the main slide valve adapted to admit air on opposite sides of said piston said means operating upon a slow reduction of brake pipe pressure to exhaust air from one side of the actuating piston and to admit and maintain pressure on the opposite side thereof, whereby the slide valve will be moved into position to connect the brake pipe and the brake pipe reservoir to the brake cylinder for a service application of the brakes, and means to connect the pressure side of the actuating piston to the exhausted side thereof to stop the valve in service application position.

26. An air brake apparatus comprising a brake pipe, a brake pipe reservoir, a slide valve, an actuating piston therefor, means independent of the main slide valve adapted to admit brake pipe air on opposite sides of said piston said means operating upon a slow reduction of brake pipe pressure to exhaust brake pipe air from one side of the actuating piston and to admit and maintain brake pipe pressure on the opposite side thereof, whereby the slide valve will be moved by brake pipe pressure into position to connect the brake pipe and the brake pipe reservoir to the brake cylinder for a service application of the brakes, and means to connect the pressure side of the actuating piston to the exhausted side thereof to stop the valve in service application position.

27. An air brake apparatus comprising a brake pipe, a brake pipe reservoir, a slide valve, an actuating piston therefor, means independent of the main slide valve adapted to admit air on opposite sides of said piston said means operating upon a slow reduction of brake pipe pressure to exhaust air from one side of the actuating piston and to admit and maintain pressure on the opposite side thereof, whereby the slide valve will be moved into position to connect the brake pipe and the brake pipe reservoir to the brake cylinder for a service application of the brakes, a by-pass around said piston and a non-return check valve therein to permit pressure to pass from the pressure side of said piston to the exhausted side thereof to stop the slide valve in service position.

28. An air brake apparatus comprising a brake pipe, a brake pipe reservoir, a slide valve, an actuating piston therefor, means independent of the main slide valve adapted to admit air on opposite sides of said piston said means operating upon a slow reduction of brake pipe pressure to exhaust air from one side of the actuating piston and to admit and maintain pressure on the opposite side thereof, whereby the slide valve will be moved into position to admit air to the brake cylinder for a service application of the brakes, and means to connect the pressure side of the actuating piston to the exhausted side thereof to stop the valve in service application position.

29. An air brake apparatus comprising a brake pipe, a triple valve embodying a slide valve and an actuating piston therefor, a brake cylinder, a brake pipe reservoir, an emergency reservoir, and means independent of the main slide valve adapted to admit brake pipe air on opposite sides of the actuating piston said means operating upon a slow reduction of brake pipe pressure to exhaust air from one side of the actuating piston to permit said piston and its slide valve to move to application position to admit brake pipe and brake pipe reservoir air to the brake cylinder for a service application of the brakes, said means being controlled by brake cylinder pressure to cause the slide valve to move to lap position when the desired pressure is in the brake cylinder.

30. In an air brake apparatus, the combination of a brake pipe, an emergency reservoir, a brake cylinder, a triple valve comprising a slide valve and an actuating piston therefor, means independent of the main slide valve operating upon a reduction of brake pipe pressure to cause the piston and slide valve to move inwardly to application position, and a release-governing valve adapted to be manually adjusted to one position to secure a quick full release of the brakes and to another position to secure a graduated release of the brakes or a slow full release of the brakes.

31. A triple valve for an air brake apparatus comprising a casing having main and supplemental brake pipe pressure chambers, a slide valve, an actuating piston connected to the slide valve and subject to the pressures of said chambers, and means operating upon a reduction of brake pipe pressure to exhaust the air from the supplemental chamber and to place the main chamber in communication with the brake pipe to permit brake pipe pressure in the main chamber to move said piston and the slide valve connected thereto into position to admit air to a brake cylinder.

32. An air brake apparatus comprising a brake pipe, a brake cylinder, a main valve controlling communication between the brake pipe and brake cylinder, and means independent of the main valve and operating upon a reduction of brake pipe pressure to admit brake pipe pressure to move said valve to open communication between the brake pipe and brake cylinder for an application of the brakes.

33. In an air brake apparatus, a brake pipe, a brake cylinder, a main slide valve, a piston connected thereto and subject on one side to brake pipe pressure, and means independent of the main valve and operating upon a reduction of brake pipe pressure to exhaust pressure from the one side of said piston and to admit and maintain brake pipe pressure on the other side thereof to move the main slide valve to open communication between the brake pipe and the brake cylinder, said means being operated by brake cylinder pressure to cause the main slide valve to close communication between the brake pipe and the brake cylinder.

34. In an air brake apparatus, a brake pipe, a brake cylinder, a main slide valve, a piston connected thereto and subject on one side to brake pipe pressure, and means independent of the main valve and operating upon a reduction of brake pipe pressure to exhaust brake pipe pressure from the one side of said piston and to admit brake pipe pressure to the other side thereof to move the main slide valve to open communication between the brake pipe and the brake cylinder.

35. In an air brake apparatus, a brake pipe, a brake cylinder, a main slide valve, a piston connected thereto and adapted to be subject on both sides to brake pipe pressure, means independent of the main valve and operating upon a reduction of brake pipe pressure to connect one side of said piston to atmosphere and maintain brake pipe pressure on the other side thereof to move the main slide valve to open communication between the brake pipe and the brake cylinder, and means to connect the pressures on opposite sides of said piston to stop the main slide valve in service position.

36. In an air brake apparatus, a brake pipe, a brake cylinder, a main slide valve, a piston connected thereto and adapted to be subject on both sides to brake pipe pressure, and means independent of the main valve and operating upon a reduction of brake pipe pressure to connect one side of said piston to atmosphere and maintain brake pipe pressure on the other side thereof to move the main slide valve to open communication between the brake pipe and the brake cylinder, said means being operated by brake cylinder pressure to cause an equalization of brake pipe pressure on opposite sides of the piston to thereby permit the main slide to move to lap position.

37. In an air brake apparatus, a brake pipe, a brake cylinder, a main slide valve, a piston connected thereto and adapted to be subject on both sides to brake pipe pressure, means independent of the main valve and operating upon a reduction of brake pipe pressure to connect one side of said piston to atmosphere and maintain brake pipe pressure on the other side thereof to move the main slide valve to open communication between the brake pipe and the brake cylinder, said means being operated by brake cylinder pressure to cause an equalization of brake pipe pressure on opposite sides of the piston, and a lap spring to move the main slide to lap position when said pressures are equalized.

38. In an air brake apparatus, a brake pipe, a brake cylinder, a main slide valve, a piston connected thereto and adapted to be subject on both sides to air under pressure, and means independent of the main slide valve and operating upon a reduction of brake pipe pressure to connect one side of said piston to atmosphere to permit the air on the other side of said piston to move the main slide valve to open communication between the brake pipe and the brake cylinder for an application of the brakes, said means being operated by brake cylinder pressure to cause the main valve to close communication between the brake pipe and the brake cylinder.

39. In an air brake apparatus, a brake pipe, a brake cylinder, a main slide valve, a piston connected thereto and adapted to be subject on both sides to air under pressure, means operating upon a reduction of brake pipe pressure to connect one side of said piston to atmosphere to permit air on the other side of said piston to move the main slide valve to open communication between the brake pipe and the brake cylinder for an application of the brakes, said means being operated by brake cylinder pressure to cause the main slide valve to close communication between the brake pipe and the brake cylinder, and means operating to admit air to the exhausted side of said piston to stop the main slide valve in service braking position.

40. An air brake apparatus comprising a brake pipe, a brake cylinder, a slide valve device controlling communication between the brake pipe and the brake cylinder, a piston connected to and operating said valve device and adapted to be subject on both of its sides to brake pipe air, and means independent of the main valve and operating upon a reduction of brake pipe pressure to cause the brake pipe pressure to move the piston and slide valve device and open communication between the brake pipe and the brake cylinder, said means being controlled by brake cylinder and brake pipe pressures to move the slide valve device to close communication between the brake cylinder and the brake pipe when the required pressure is in the brake cylinder.

41. An air brake apparatus comprising a triple valve, a brake cylinder, a brake pipe connected to the triple valve, a main slide valve in said triple valve, a main actuating piston connected to said slide valve, and means independent of the main slide valve to admit brake pipe pressure on opposite sides of the main actuating piston, said means operating upon a reduction of brake pipe pressure to exhaust brake pipe air from one side of said actuating piston to permit brake pipe air on the opposite side of said piston to move it and the main slide valve into position to admit brake pipe air to the brake cylinder.

42. A triple valve for an air brake apparatus comprising a slide valve, an actuating piston connected thereto, and means independent of the main slide valve for admitting air on opposite sides of said actuating piston, said means operating upon a reduction of brake pipe pressure to exhaust the air from one side of said actuating piston to permit the air on the opposite side of said piston to move said piston and the slide valve connected thereto into position to admit brake pipe air to the brake cylinder.

43. A triple valve for an air brake apparatus comprising a slide valve, an actuating piston connected thereto, means independent of the main slide valve for admitting air on opposite sides of said actuating piston said means operating upon a reduction of brake pipe pressure to exhaust the air from one side of said actuating piston to permit the air on the opposite side of said piston to move said piston and the slide valve connected thereto into position to admit brake pipe air to a brake cylinder, and means independent of the slide valve and operating when the slide valve is in application position to admit air to the exhausted side of the actuating piston to stop said piston and slide valve in application position.

44. A triple valve for an air brake apparatus comprising a slide valve, an actuating piston connected thereto, and means independent of the main slide valve for admitting air on opposite sides of said actuating piston said means operating upon a reduction of brake pipe pressure to exhaust the air from one side of said actuating piston to permit the air on the opposite side of said piston to move said piston and the slide valve connected thereto into position to admit brake pipe air to a brake cylinder, said means being also controlled by brake cylinder pressure to cause the slide valve to move to lap position.

45. An air brake apparatus comprising a brake pipe, a brake cylinder, an emergency reservoir, a main slide valve, a piston connected to said valve and subject on both sides to air under pressure, and a pilot valve subject to brake pipe emergency reservoir and brake cylinder pressures and controlling the application and release movements of the main slide valve and the piston connected thereto.

46. An air brake apparatus comprising an emergency reservoir, a brake pipe reservoir, a brake cylinder, a brake pipe, a main slide valve an abutment for operating said slide valve, and a valve independent of the main slide valve and operating upon an increase in brake pipe pressure to charge the brake pipe reservoir, said independent valve operating upon an equalization of brake pipe and brake pipe reservoir pressures to open communication between the brake pipe reservoir and the emergency reservoir to charge the emergency reservoir.

47. In an air brake apparatus, a brake pipe, a brake pipe reservoir, a triple valve comprising a casing having main and supplemental brake pipe chambers, an abutment subject on opposite sides to brake pipe pressure in said chambers, a valve operable by said abutment, and a pilot valve operating upon a reduction of brake pipe pressure to connect the supplemental brake pipe chamber to atmosphere and the main chamber to brake pipe to move said abutment and the valve connected thereto to a position to admit air from the brake pipe to a brake cylinder.

48. In an air brake apparatus, a brake pipe, a brake pipe reservoir, a triple valve comprising a casing having main and supplemental brake pipe chambers, an abutment subject on opposite sides to brake pipe pressure in said chambers, a valve operable by said abutment, and a pilot valve operating upon a reduction of brake pipe pressure to connect the supplemental brake pipe chamber to atmosphere and the brake pipe to the main chamber to move said abutment and the valve connected thereto to a position to admit air from the brake pipe to a brake cylinder, said pilot valve being adapted to be operated by brake pipe, brake cylinder and emergency reservoir pressures to move it to lap position.

49. In an air brake apparatus, a brake pipe, a brake pipe reservoir, a triple valve provided with main and supplemental brake pipe chambers, a movable abutment separating said chambers and adapted to be subject on opposite sides to brake pipe pressure in said chambers, a main slide valve operatively connected to said abutment, and a pilot valve operating upon a service reduction of brake pipe pressure to connect the supplemental brake pipe chamber to atmosphere and the main chamber to the brake pipe to move said abutment and the valve connected thereto into position to connect the brake pipe and the brake pipe reservoir to the brake cylinder for a service application of the brakes, and means to connect the brake pipe to the supplemental brake pipe chamber to arrest the main valve in service application position.

50. In an air brake apparatus, a brake pipe, a brake pipe reservoir, a triple valve provided with main and supplemental brake pipe chambers, a movable abutment separating said chambers and adapted to be subject on opposite sides to brake pipe pressure in said chambers, a main slide valve operatively connected to said abutment, a pilot valve operating upon a service reduction of brake pipe pressure to connect the supplemental brake pipe chamber to atmosphere and the main chamber to the brake pipe to move said abutment and the valve connected thereto into position to connect the brake pipe and the brake pipe reservoir to the brake cylinder for a service application of the brakes, means to connect the brake pipe to the supplemental brake pipe chamber to arrest in service application position the main valve, means connected to the pilot valve and subject to brake cylinder pressure to move the pilot valve to lap position when the desired pressure is in the brake cylinder and to thereby permit of an equalization of brake pipe pressure in the main and supplemental brake pipe chambers, and means to move the main slide valve to lap position upon said equalization of pressures.

51. In an air brake apparatus, a brake pipe, a brake pipe reservoir, an emergency reservoir, a triple valve provided with main and supplemental brake pipe chambers, a movable abutment separating said chambers and adapted to be subject on opposite sides to brake pipe pressure in said chambers, a main slide valve operatively connected to said abutment, a pilot valve operating upon a slow reduction of brake pipe pressure to connect the supplemental brake pipe chamber to atmosphere and the main chamber to the brake pipe to move said abutment and the valve connected thereto into position to connect the brake pipe and the brake pipe reservoir to the brake cylinder for a service application of the brakes, means to connect the brake pipe to the supplemental brake pipe chamber to arrest the movement of the main valve, and means operating upon a sudden reduction in brake pipe pressure to move the main valve to seal the brake pipe and to connect the brake pipe reservoir and the emergency reservoir to the brake cylinder.

52. An air brake apparatus comprising a brake pipe, a brake pipe reservoir, a slide valve, an actuating piston therefor, means independent of the main slide valve and operating on an increase in brake pipe pressure to admit brake pipe air on one side of said piston and connect the other side of said piston to atmosphere to thereby move the main slide valve to release position, said means also operating to admit brake pipe air to both sides of said piston when brake cylinder pressure is reduced to the desired brake cylinder pressure, to thereby balance brake pipe pressure on opposite sides of the said piston with the slide valve in release position, and a release lap spring to move the said piston and slide valve to lap position.

53. A triple valve comprising a casing having main and supplemental brake pipe chambers, an abutment adapted to be subject on opposite sides to the pressures of said chambers, a main slide valve operable by said abutment, and a pilot valve operating upon an increase of brake pipe pressure to connect the supplemental brake pipe chamber to the brake pipe and the main brake pipe chamber to atmosphere, thereby to move the abutment and the main slide valve to release position.

54. A triple valve comprising a casing having main and supplemental brake pipe chambers, an abutment adapted to be subject on opposite sides to the pressures of said chambers, a main slide valve operable by said abutment, and a pilot valve subject to brake pipe and brake cylinder pressures opposed to the pressure of an emergency reservoir and operating upon an increase of brake pipe pressure to connect the supplemental brake pipe chamber to the brake pipe and the main brake pipe chamber to atmosphere, thereby to move the abutment and the main slide valve to release position.

55. A triple valve comprising a casing having main and supplemental brake pipe chambers, an abutment adapted to be subject on opposite sides to the pressures of said chambers, a main slide valve operable by said abutment, and a pilot valve subject to brake pipe and brake cylinder pressures opposed to the pressure of an emergency reservoir and operating upon an increase of brake pipe pressure to connect the supplemental brake pipe chamber to the brake pipe and the main brake pipe chamber to atmosphere, thereby to move the abutment and the main slide valve to release position, said pilot valve moving to lap position when the emergency reservoir pressure is balanced by the opposed pressure to thereby admit brake pipe air to the main and supplemental brake pipe chambers.

56. A triple valve comprising a casing having main and supplemental brake pipe chambers, an abutment adapted to be subject on opposite sides to the pressures of said chambers, a main slide valve operable by said abutment, a pilot valve subject to brake pipe and brake cylinder pressures opposed to the pressure of an emergency reservoir and operating upon an increase of brake pipe pressure to connect the supplemental brake pipe chamber to the brake pipe and the main brake pipe chamber to atmosphere, thereby to move the abutment and the main slide valve to release position, said pilot valve moving to lap position when the emergency reservoir pressure is balanced by the opposed pressure to thereby admit brake pipe air to the main and supplemental brake pipe chambers, and means to move the main slide to lap position when the pressures in the main and supplemental chambers are equal.

57. A triple valve comprising a casing having main and supplemental brake pipe chambers, an abutment adapted to be subject on opposite sides to the pressures in said chambers, a main slide valve operable by said abutment, and a pilot valve operated by variations in brake pipe pressure, and which pilot valve in service position connects the supplemental brake pipe chamber to atmosphere and the main brake pipe chamber to brake pipe, in release position connects the main brake pipe chamber to atmosphere and the supplemental brake pipe chamber to brake pipe, and in lap position connects both said chambers to brake pipe.

58. In an air brake apparatus, the combination of a brake pipe, a brake cylinder, an emergency reservoir, a triple valve comprising a main slide valve and an actuating piston therefor, means independent of the main slide valve operating upon a reduction of brake pipe pressure to cause the piston and the main slide valve to move inwardly to application position, a release governing valve adapted to be manually adjusted to one position for a graduated release of the brakes and in another position to secure a full release of the brakes, an emergency valve operated by an increase of brake pipe pressure to cause a movement of the main slide valve to release position to thereby permit the emergency reservoir air to flow to the brake pipe through the release governing valve when the said release governing valve is in quick release position.

59. In an air brake apparatus, the combination of a brake pipe, a brake cylinder, an emergency reservoir, a triple valve comprising a main slide valve and an actuating piston therefore, a pilot valve independent of the main slide valve and operating upon a reduction of brake pipe pressure to cause the piston and the main slide valve to move inwardly to application position and operating upon an increase of brake pipe pressure to cause the main slide valve to move outwardly to release position, an emergency valve operated by an increase of brake pipe pressure to cause a sudden movement of the pilot valve to release position thereby to secure a movement of the main slide valve to release position, and a release governing valve adapted to be manually adjusted to one position for a graduated release of the brakes and to another release position for a quick release of the brakes, said release governing valve in quick release position cooperating with the emergency valve to secure the sudden movement of the pilot valve to release position and also permitting the emergency reservoir air to flow to the brake pipe when the main slide valve is in release position.

60. In an air brake apparatus, the combination of a brake pipe, an emergency reservoir, a brake cylinder, a triple valve comprising a main slide valve and an actuating piston therefor, means independent of the main slide valve operating upon a reduction of brake pipe pressure to cause the piston and slide valve to move inwardly to application position, and a release governing valve adapted to be manually adjusted to one position to secure a full release of the brakes and to another position to secure a graduated release of the brakes, said release governing valve in quick release position permitting the emergency reservoir air to flow to the brake pipe when the main slide valve is in release position thereby to quickly raise brake pipe pressure.

61. An air brake apparatus, the combination of a brake pipe, a brake cylinder, an emergency reservoir, a triple valve comprising a main slide valve, and an actuating piston therefor, a pilot valve adapted to be subject to brake pipe, brake cylinder and emergency reservoir pressures and operating upon a reduction of brake pipe pressure to cause the piston and the main slide valve to move inwardly to application position and operating upon an increase of brake pipe pressure to cause the main slide valve to move outwardly to release position, an emergency valve operated by a reduction of brake pipe pressure to admit emergency reservoir air to the pilot valve operating means thereby to move said pilot valve to service position, and operating upon an increase of brake pipe pressure after an application of the brakes to exhaust emergency reservoir air from the pilot valve operating-means thereby to permit the brake pipe pressure to move said pilot valve suddenly to release position, and a release governing valve adapted to be manually adjusted to one position for a graduated release of the brakes and to another position for a quick release of the brakes, said release governing valve in quick release position cooperating with the emergency valve to secure the sudden movement of the pilot valve to release position and also permitting the emergency reservoir air to flow to the brake pipe when the main slide valve is in release position.

62. In an air brake apparatus, a brake pipe, a brake pipe reservoir, an emergency reservoir, a triple valve provided with main and supplemental brake pipe chambers, a movable abutment separating said chambers, a main slide valve operatively connected to said abutment, a pilot valve operating upon a slow reduction of brake pipe pressure to connect the supplemental brake pipe chamber to atmosphere and the brake pipe to the main chamber to move said abutment and the valve connected thereto into position to connect the brake pipe and the brake pipe reservoir to the brake cylinder for a service application of the brakes, and means operating upon a sudden reduction in brake pipe pressure to place the emergency reservoir in communication with the main brake pipe chamber thereby to move the main valve to emergency position said main valve in emergency position sealing the brake pipe and connecting the brake pipe reservoir and the emergency reservoir to the brake cylinder.

63. In an air brake apparatus, a brake pipe, a brake pipe reservoir, an emergency reservoir, a triple valve provided with main and supplemental brake pipe chambers, a movable abutment separating said chambers, a main slide valve operatively connected to said abutment, a pilot valve operating upon a slow reduction of brake pipe pressure to connect the supplemental brake pipe chamber to atmosphere and the brake pipe to the main chamber to move said abutment and the valve connected thereto into position to connect the brake pipe and the brake pipe reservoir to the brake cylinder for a service application of the brakes, means to connect the brake pipe to the supplemental brake pipe chamber to arrest the movement of the main valve, and an emergency valve operated by a slow reduction of brake pipe pressure for a service application of the brakes to maintain the brake pipe in communication with the main brake pipe chamber through the pilot valve ports, said emergency valve operating upon a sudden reduction in brake pipe pressure for an emergency application of the brakes to close communication between the brake pipe and the main brake pipe chamber and open communication between the emergency reservoir and the main brake pipe chamber thereby to move the abutment and the main slide valve to emergency position.

64. In an air brake apparatus, a brake pipe, a brake pipe reservoir, an emergency reservoir, a triple valve provided with main and supplemental brake pipe chambers, a movable abutment separating said chambers, a main slide valve operatively connected to said abutment, a pilot valve operating upon a slow reduction of brake pipe pressure to connect the supplemental brake pipe chamber to atmosphere and the brake pipe to the main chamber to move said abutment and the valve connected thereto into position to connect the brake pipe and the brake pipe reservoir to the brake cylinder for a service application of the brakes, means to connect the brake pipe to the supplemental brake pipe chamber to arrest the movement of the main valve, an emergency valve operated by a slow reduction of brake pipe pressure for a service application of the brakes to maintain the brake pipe in communication with the main brake pipe chamber through the pilot valve ports, said emergency valve operating upon a sudden reduction in brake pipe pressure for an emergency application of the brakes to close communication between the brake pipe and the main brake pipe chamber and open communication between the emergency reservoir and the main brake pipe chamber thereby to move the abutment and the main slide valve to emergency position, a brake pipe vent valve, and means to cause said vent valve to open when the main slide valve is in emergency position.

65. In an air brake apparatus, a brake pipe, a brake pipe reservoir, an emergency reservoir, a triple valve provided with main and supplemental brake pipe chambers, a movable abutment separating said chambers, a main slide valve operatively connected to said abutment, a pilot valve operating upon a slow reduction of brake pipe pressure to connect the supplemental brake pipe chamber to atmosphere and the brake pipe to the main chamber to move said abutment and the valve connected thereto into position to connect the brake pipe and the brake pipe reservoir to the brake cylinder for a service application of the brakes, and means operating upon a sudden reduction in brake pipe pressure to place the emergency reservoir in communication with the main brake pipe chamber thereby to move the main valve to emergency position, said main valve in emergency position sealing the brake pipe and connecting the brake pipe reservoir and the emergency reservoir to the brake cylinder.

66. In an air brake apparatus, a brake pipe, a brake pipe reservoir, an emergency reservoir, a triple valve provided with main and supplemental brake pipe chambers, a movable abutment separating said chambers, a main slide valve operatively connected to said abutment, a pilot valve operating upon a slow reduction of brake pipe pressure to connect the supplemental brake pipe chamber to atmosphere and the brake pipe to the main chamber to move said abutment and the valve connected thereto into position to connect the brake pipe and the brake pipe reservoir to the brake cylinder for a service application of the brakes, means operating upon a sudden reduction in brake pipe pressure to place the emergency reservoir in communication with the main brake pipe chamber thereby to move the main valve to emergency position, said main valve in emergency position sealing the brake pipe and connecting the brake pipe reservoir and the emergency reservoir to the brake cylinder, a brake pipe vent valve, and means to cause said vent valve to open when the main slide is in emergency position.

67. An air brake apparatus comprising a brake pipe, a brake pipe reservoir, an emergency reservoir, a brake cylinder, a triple valve, a main slide valve therein, an abutment for said main slide valve, means operated by variations in brake pipe pressure to control the movement of said abutment and the main slide valve, a charging valve independent of said main slide valve and its abutment and operating upon an increase in brake pipe pressure to open communication between the brake pipe and the brake pipe reservoir and to close communication between the brake pipe and emergency reservoir, means to move said charging valve to open communication between the brake pipe reservoir and the emergency reservoir upon an equalization of pressures in the brake pipe and the brake pipe reservoir when the said equalized pressure is greater than the pressure in the emergency reservoir.

68. In an air brake apparatus, a brake pipe, a brake pipe reservoir, an emergency reservoir, a triple valve provided with main and supplemental brake pipe chambers, a movable abutment separating said chambers, a main slide valve operatively connected to said abutment, a pilot valve, an actuating diaphragm subject to brake pipe pressure in an actuating chamber, an equalizing diaphragm larger than the actuating diaphragm and subject to brake cylinder pressure in an equalizing chamber, an emergency diaphragm slightly smaller than the actuating diaphragm and subject to pressure in an emergency chamber, means operatively connecting the said three diaphragms to the pilot valve, said pilot valve operating upon a slow reduction of brake pipe pressure in the actuating chamber to connect the supplemental brake pipe chamber to atmosphere and the brake pipe to the main brake chamber, means to connect the brake pipe to the supplemental brake pipe chamber to arrest the movement of the main slide valve, an emergency valve operating upon a slow reduction of brake pipe pressure for a service application of the brakes to maintain the brake pipe in communication with the main brake pipe chamber through the pilot valve ports, said emergency valve operating upon a sudden reduction in brake pipe pressure for an emergency application of the brakes to close communication between the brake pipe and the main brake pipe chamber and open communication between the emergency reservoir and the main brake pipe chamber thereby to move the abutment and the main slide valve to emergency position, means to connect the brake pipe to the actuating chamber, means to connect the brake cylinder to the equalizing chamber, and means to connect the emergency reservoir to the emergency reservoir chamber.

69. In an air brake apparatus, a brake pipe, a brake pipe reservoir, an emergency reservoir, a triple valve provided with main and supplemental brake pipe chambers, a movable abutment separating said chambers, a main slide valve operatively connected to said abutment, a pilot valve, an actuating diaphragm subject to brake pipe pressure in an actuating chamber, an equalizing diaphragm larger than the actuating diaphragm and subject to brake cylinder pressure in an equalizing chamber, an emergency diaphragm slightly smaller than the actuating diaphragm and subject to pressure in an emergency chamber, means operatively connecting the said three diaphragms to the pilot valve, said pilot valve operating upon a slow reduction of brake pipe pressure in the actuating chamber to connect the supplemental brake pipe chamber to atmosphere and the brake pipe to the main brake pipe chamber, means to connect the brake pipe to the supplemental brake pipe chamber to arrest the movement of the main slide valve, an emergency slide valve, an emergency piston connected to said emergency slide valve and subject on opposite sides to the pressures of the brake pipe and a quick action chamber and operable by the pressure in the quick action chamber upon an emergency reduction in brake pipe pressure to move the emergency valve to open direct communication between the emergency reservoir and the main brake pipe chamber and to close communication between the main brake pipe chamber and the brake pipe, said emergency valve operating upon a slow reduction in brake pipe pressure for a service application of the brakes to maintain communication between the brake pipe and the main brake pipe chamber through the ports of the pilot valve, means to maintain communication between the brake pipe and the actuating chamber during all slow reductions of brake pipe pressure, said means placing the actuating chamber in communication with the quick action chamber when the emergency valve piston is in emergency position, means connecting the brake cylinder to the equalizing chamber, and means to connect the emergency reservoir to the emergency reservoir chamber.

70. An air brake apparatus in accordance with claim 69 combined with ports controlled by the emergency valve adapted to connect the quick action chamber to the brake cylinder when the emergency slide valve is in emergency position.

71. An air brake apparatus in accordance with claim 69 combined with a manually operable quick release valve cooperating with the emergency valve and adapted when in quick release position to vent the emergency reservoir chamber to atmosphere through the emergency slide valve when said valve is in release position and permitting the emergency reservoir air to flow to the brake pipe.

72. A triple valve comprising a casing having main and supplemental brake pipe chambers, an abutment adapted to be subject on opposite sides to the pressures of said chambers, a main slide valve operable by said abutment, a pilot valve subject to brake pipe and brake cylinder pressures opposed to the pressure of an emergency reservoir and operating upon an increase of brake pipe pressure to connect the supplemental brake pipe chamber to the brake pipe and the main brake pipe chamber to atmosphere, thereby to move the abutment and the main slide valve to release position, said pilot valve moving to lap position when the emergency reservoir pressure is balanced by the opposed pressure to thereby admit brake pipe air to the main and supplemental brake pipe chambers, means to move the main slide to lap position when the pressures in the main and supplemental chambers are equal, and a release lap spring adapted to move the main slide valve to release lap position upon an equalization of pressures in the main and supplemental brake pipe chambers after a partial release of brake cylinder pressure.

73. A triple valve comprising a casing having main and supplemental brake pipe chambers, an abutment adapted to be subject on opposite sides to the pressures in said chambers, a main slide valve operable by said abutment, a pilot valve operated by variations in brake pipe pressure, and which pilot valve in service position connects the supplemental brake pipe chamber to atmosphere and the main brake pipe chamber to brake pipe, in release position connects the main brake pipe chamber to atmosphere and the supplemental brake pipe chamber to brake pipe, and in lap position connects both said chambers to brake pipe, and a release lap spring adapted to move the main slide valve to release lap position upon an equalization of pressures in the main and supplemental brake pipe chambers after a partial release of brake cylinder pressure.

74. A triple valve comprising a casing having main and supplemental brake pipe chambers, an abutment adapted to be subject on opposite sides to the pressures of said chambers, a main slide valve operable by said abutment, a pilot valve subject to brake pipe and brake cylinder pressures opposed to the pressure of an emergency reservoir and operating upon an increase of brake pipe pressure to connect the supplemental brake pipe chamber to the brake pipe and the main brake pipe chamber to atmosphere, thereby to move the abutment and the main slide valve to release position, said pilot valve moving to lap position when the emergency reservoir pressure is balanced by the opposed pressure to thereby admit brake pipe air to the main and supplemental brake pipe chambers, and a service lap spring to move the main slide to lap position when the pressures in the main and supplemental chambers are equal.

75. A triple valve for an air brake apparatus comprising a main valve to admit air to the brake cylinder, an actuating means therefor, and means independent of the main valve adapted to admit air on opposite sides of said actuating means, said means operating upon a reduction of brake pipe pressure to reduce the air pressure on one side of said actuating means and to admit air to the other side to actuate said means to move the main valve into position to admit air to a brake cylinder said means operating upon an increase in brake pipe pressure to reverse the said operation and thereby reverse the pressures on opposite sides of the said actuating means to move the main valve into position to release air from the brake cylinder.

76. A triple valve for an air brake apparatus comprising a main valve to admit air to the brake cylinder, an actuating means therefor, and means independent of the main valve adapted to admit air on opposite sides of said actuating means, said means operating upon a reduction of brake pipe pressure to exhaust the air from one side of said actuating means to atmosphere and admit air to the opposite side of said means to move the main valve into position to admit air to a brake cylinder said means operating upon an increase in brake pipe pressure to reverse the said operation and thereby reverse the pressures on opposite sides of the said actuating means to move the main valve into position to release air from the brake cylinder.

77. A triple valve for an air brake apparatus comprising a main valve to admit air to the brake cylinder, an actuating means therefor, and means independent of the main valve adapted to admit brake pipe pressure on opposite sides of said actuating means said means operating upon a reduction of brake pipe pressure to exhaust brake pipe air from one side of said actuating means to permit the brake pipe air on the opposite side of said actuating means to move the valve into position to admit air to the brake cylinder said means operating upon an increase in brake pipe pressure to reverse the said operation and thereby reverse the pressures on opposite sides of the said actuating means to move the main valve into position to release air from the brake cylinder.

78. A triple valve for an air brake apparatus comprising a main valve to admit air to a brake cylinder, an actuating means therefor, means independent of the main valve adapted to admit brake pipe pressure on opposite sides of the said actuating means said means operating upon a reduction of brake pipe pressure to exhaust brake pipe air from one side of said actuating means and to admit brake pipe air on the opposite side of said actuating means to move the main valve into application position to admit air to a brake cylinder, said independent means operating upon an increase in brake pipe pressure to reverse the said operation and thereby reverse the pressures on opposite sides of the said actuating means to move the main valve into position to release air from the brake cylinder, and means independent of the main valve and operating in the application position of the actuating means to admit brake pipe air to the exhausted side of the actuating means to stop the main valve in application position.

79. An air brake apparatus comprising an emergency reservoir, a brake pipe reservoir, a brake cylinder, a brake pipe, a main slide valve, an abutment for operating said slide valve, and a charging valve independent of the main slide valve and operating upon an increase in brake pipe pressure to open communication between the brake pipe and the brake pipe reservoir and close communication with the emergency reservoir to thereby charge the brake pipe reservoir independently of the emergency reservoir and means operating upon an equalization of brake pipe and brake pipe reservoir pressures to move said charging valve to open communication between the brake pipe reservoir, the emergency reservoir and the brake pipe, said means operating on an equalization of said three pressures to move the charging valve against brake pipe pressure to close communication between the brake pipe and the said two reservoirs.

80. An air brake apparatus comprising a brake pipe, a brake cylinder, an emergency reservoir, a brake pipe reservoir, a main slide valve, an abutment connected to and adapted to operate said slide valve and operating upon a reduction of brake pipe pressure to move said slide valve to application position, and a charging valve independent of the main slide valve and controlling communication between the brake pipe, the brake pipe reservoir and the emergency reservoir for the charging operation, means to move said charging valve to close communication between the brake pipe and the said two reservoirs upon an equalization of pressures in the brake pipe in said reservoirs, said charging valve being operated by brake pipe pressure to open communication between the brake pipe and said reservoirs upon a reduction of pressure in either of said reservoirs below brake pipe pressure, whereby leakage in either of said reservoirs will result in a brake pipe pressure reduction.

81. In an air brake apparatus a triple valve having a slide valve therein, a movable abutment operatively connected to said slide valve, means operating on a slow reduction of brake pipe pressure to cause the main slide valve to move to service application position, means operating upon a rapid reduction in brake pipe pressure to cause the main slide valve to move to emergency application position, an independent brake pipe vent valve, and means operating when the main slide valve is in emergency position to cause said vent valve to open the brake pipe to atmosphere.

82. In an air brake apparatus a triple valve having a slide valve therein, a movable abutment operatively connected to said slide valve, means operating on a slow reduction of brake pipe pressure to cause the main slide valve to move to service application position, means operating upon a rapid reduction in brake pipe pressure to cause the main slide valve to move to emergency application position, an independent brake pipe vent valve, a piston connected to said valve, means whereby said piston will be subject on opposite sides to brake pipe pressure, means operating when the main slide valve is in emergency position to exhaust pressure from one side of the vent valve piston thereby to permit the pressure on the other side of said piston to move the vent valve to open the brake pipe to atmosphere.

83. An air brake apparatus comprising a brake pipe, a triple valve, a reservoir adapted to contain a supply of air for service braking, an emergency reservoir adapted to contain a supply of air for emergency braking, an independent charging valve controlling communication between the brake pipe and said two reservoirs said charging valve operating to close the charging connection between the brake pipe and said two reservoirs when there is an equalization of pressures in said two reservoirs and in the brake pipe, said charging valve being operated by brake pipe pressure to open communication between the brake pipe and said two reservoirs when the pressure in either of said reservoirs leaks down below brake pipe pressure after the equalization of the said three pressures.

84. An air brake apparatus comprising a brake pipe, a triple valve, a reservoir adapted to contain a supply of air for service braking, an emergency reservoir adapted to contain a supply of air for emergency braking, means whereby the triple valve upon a slow reduction of brake pipe pressure will connect one of said reservoirs to the brake cylinder for a service application of the brakes, means whereby upon a sudden reduction in brake pipe pressure the triple valve will connect the emergency reservoir to the brake cylinder for an emergency application of the brakes, an independent charging valve controlling communication between the brake pipe and the said two reservoirs and operating to charge said reservoirs on an increase of brake pipe pressure, said charging valve operating to close the charging connection between the brake pipe and said two reservoirs when there is an equalization of pressures in said two reservoirs and in the brake pipe and being operated by brake pipe pressure to open communication between the brake pipe and said two reservoirs when the pressure in either of the said reservoirs leaks down below brake pipe pressure after the equalization of said three pressures, and a check valve arranged in the charging connection of the emergency reservoir and seated toward the charging valve whereby said check valve will prevent the depletion of the emergency reservoir through the charging valve should the pressure in the other reservoir be reduced below the emergency reservoir pressure.

85. An air brake apparatus comprising a brake pipe, a triple valve, a reservoir adapted to contain a supply of air for service braking, an emergency reservoir adapted to contain a supply of air for emergency braking, an independent charging valve operating upon an increase of brake pipe pressure to open communication between the brake pipe and the reservoir adapted to contain air for service braking, means to move the charging valve against brake pipe pressure upon an equalization of pressures in the brake pipe and said reservoir to thereby open communication between the brake pipe, the service braking reservoir and the emergency reservoir, said means also moving the charging valve to close communication between the brake pipe and said reservoirs upon an equalization of the three pressures.

In testimony whereof I hereunto affix my signature.

SPENCER G. NEAL.